United States Patent Office 2,931,120
Patented Apr. 5, 1960

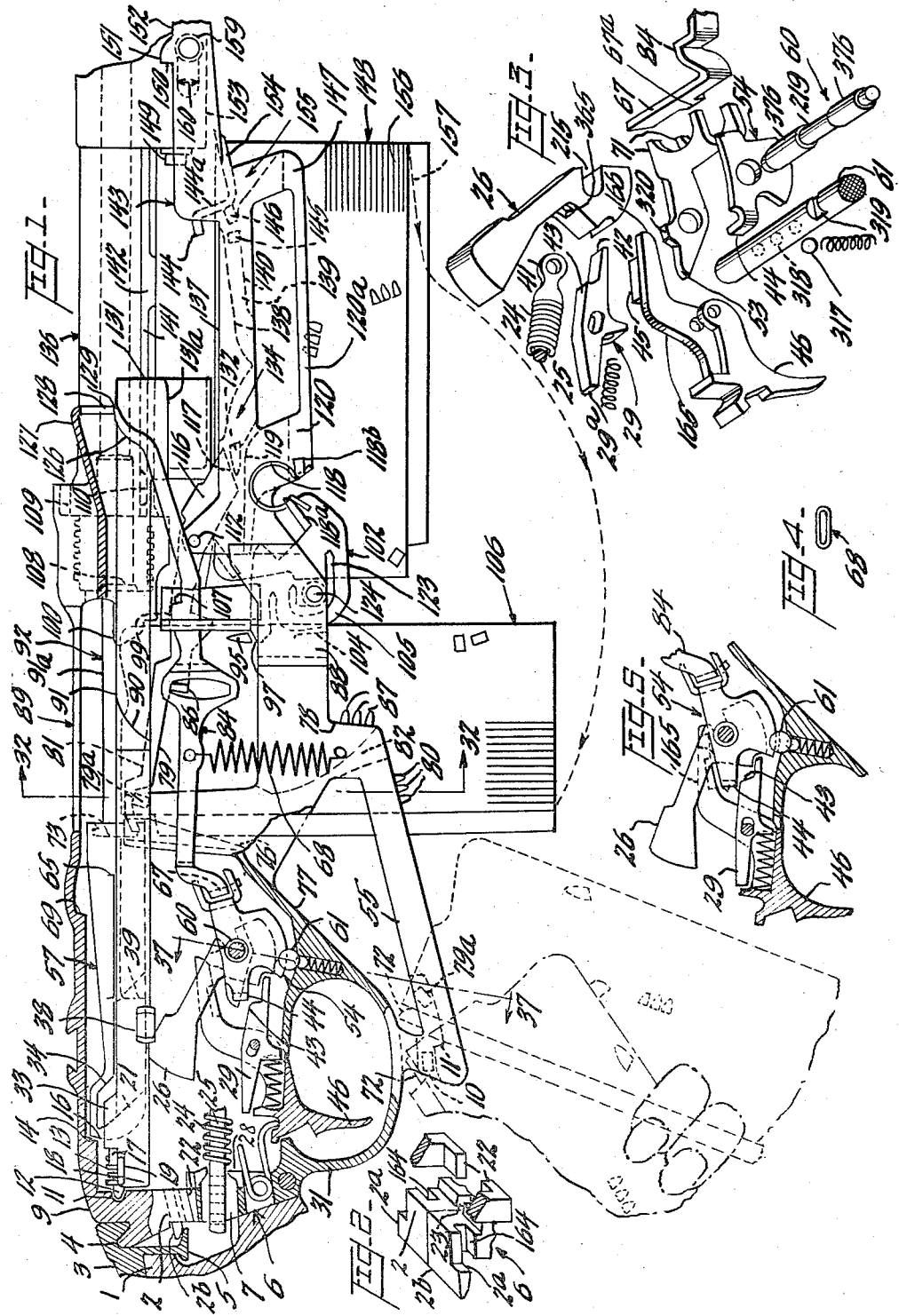

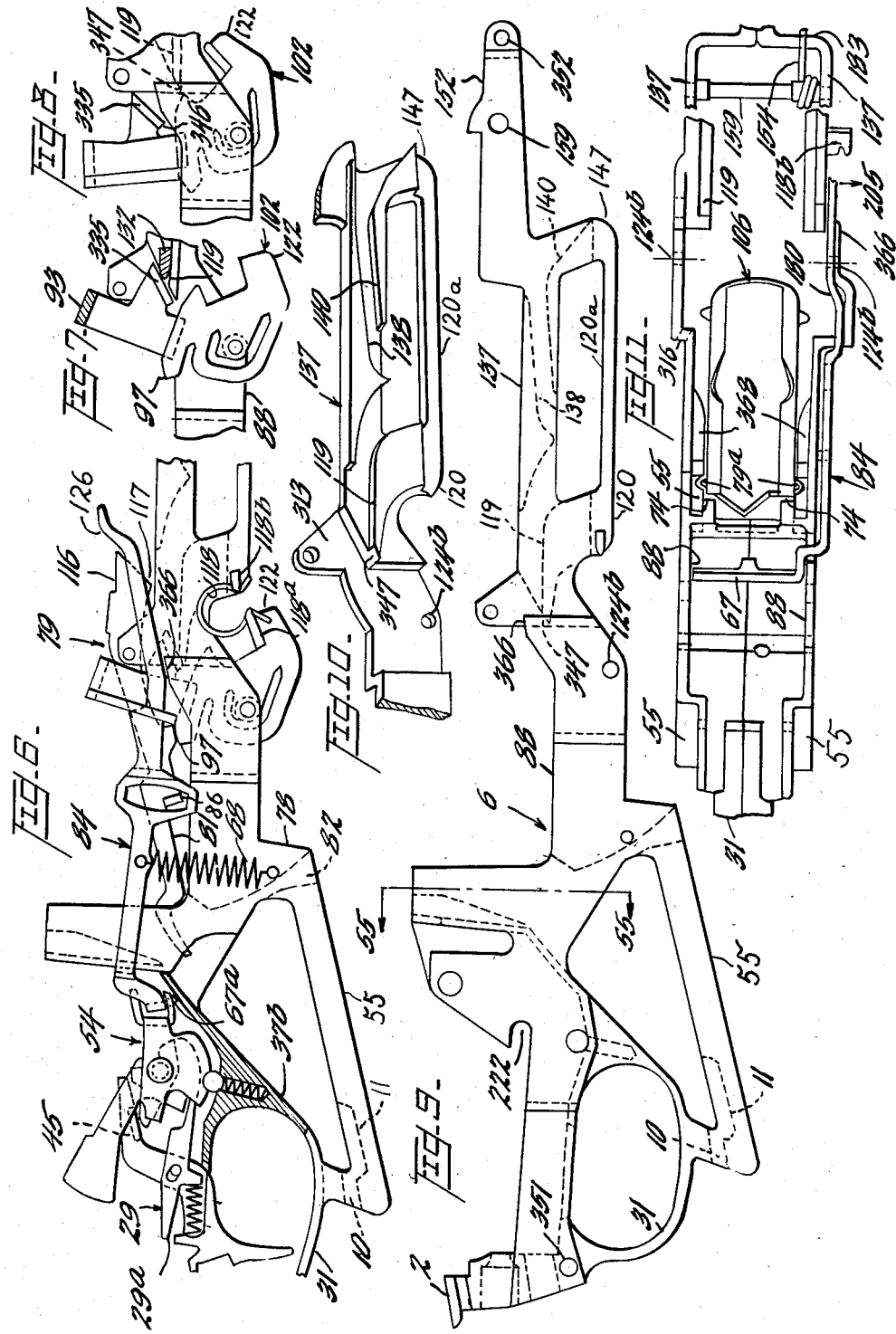

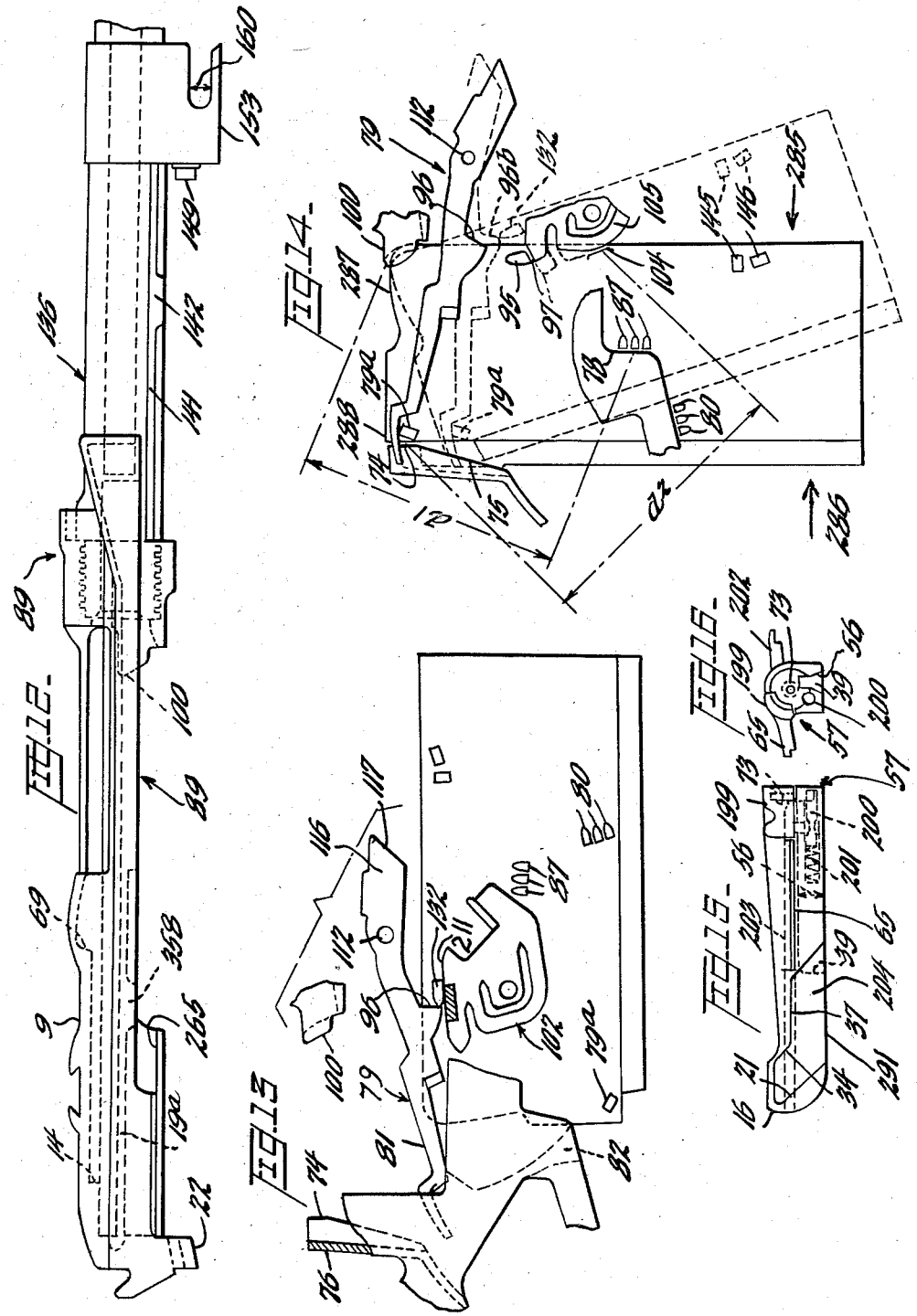

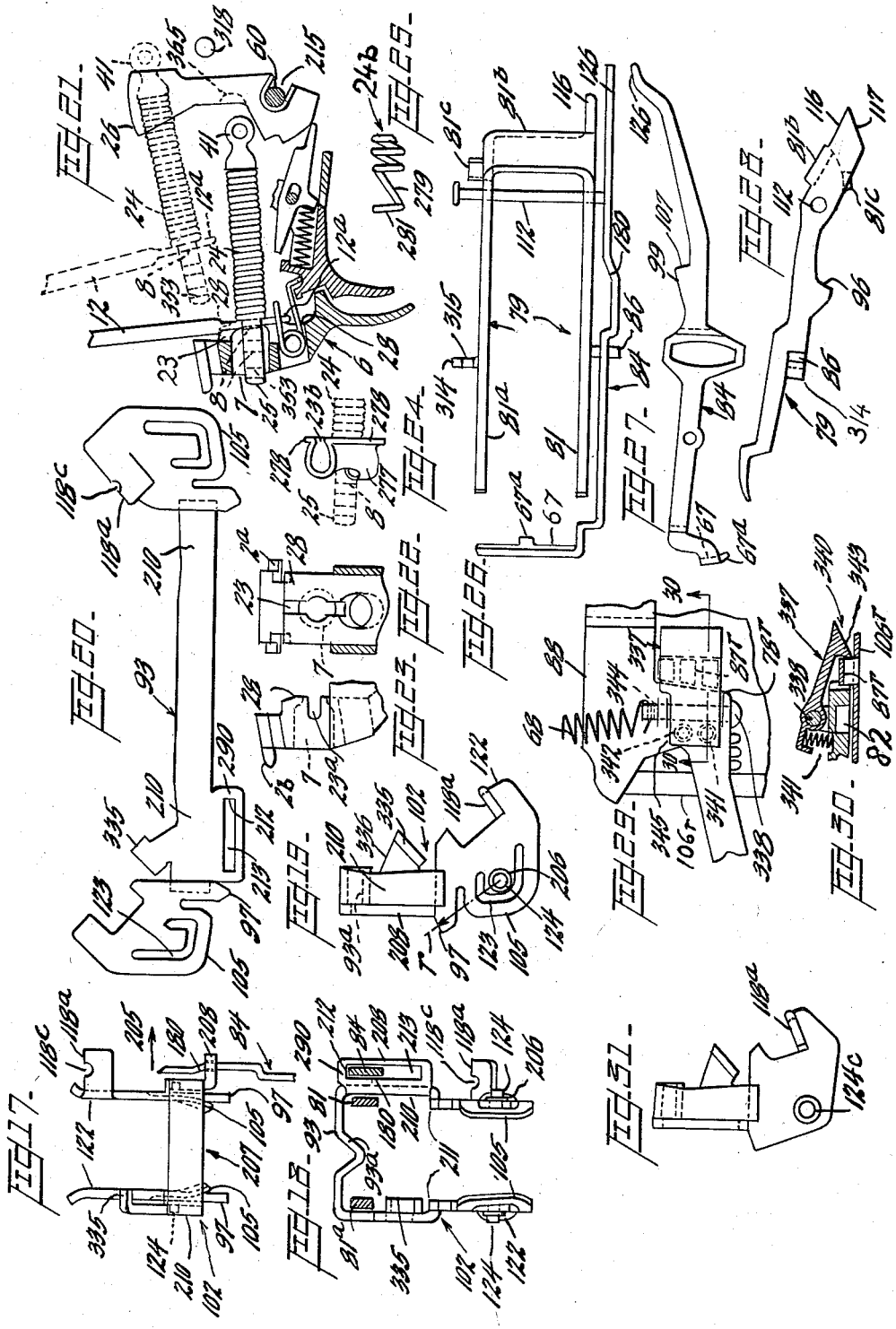

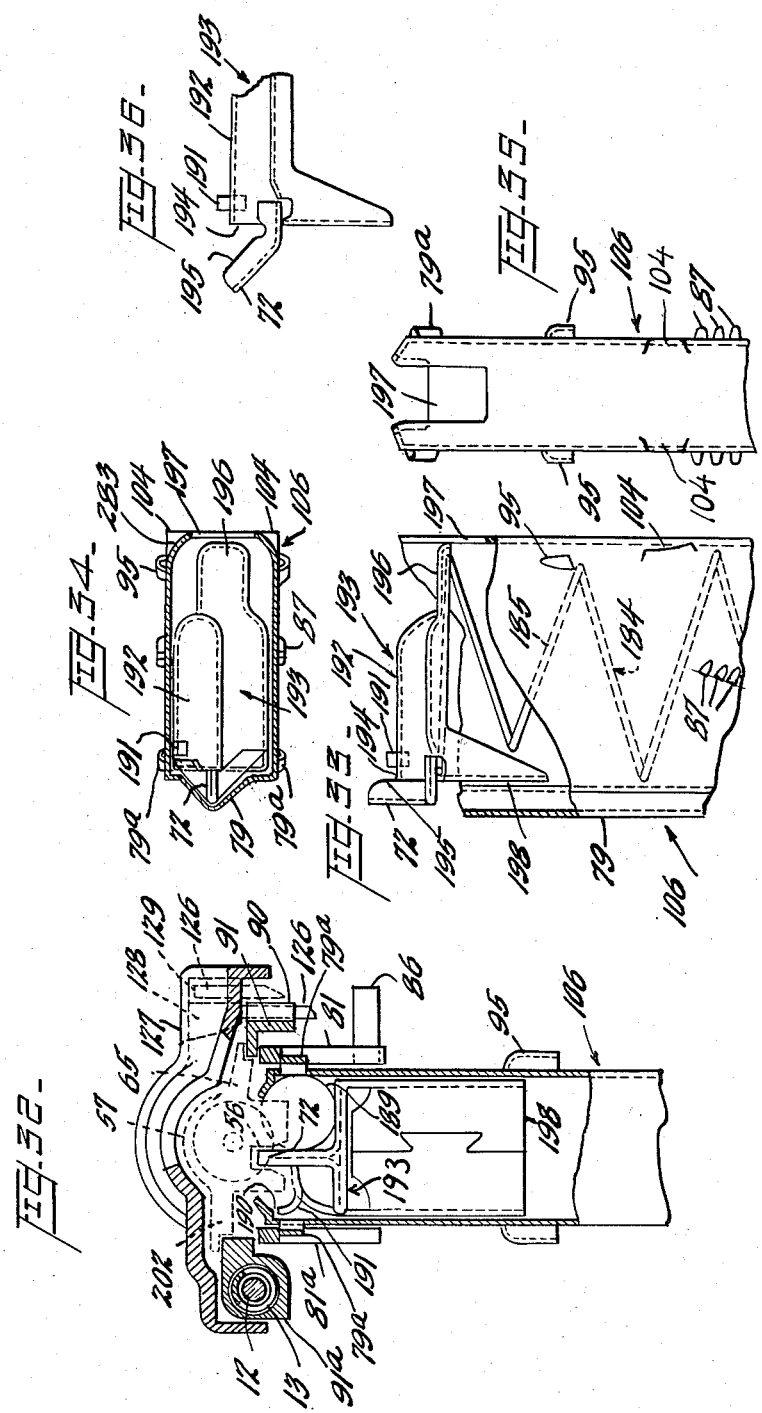

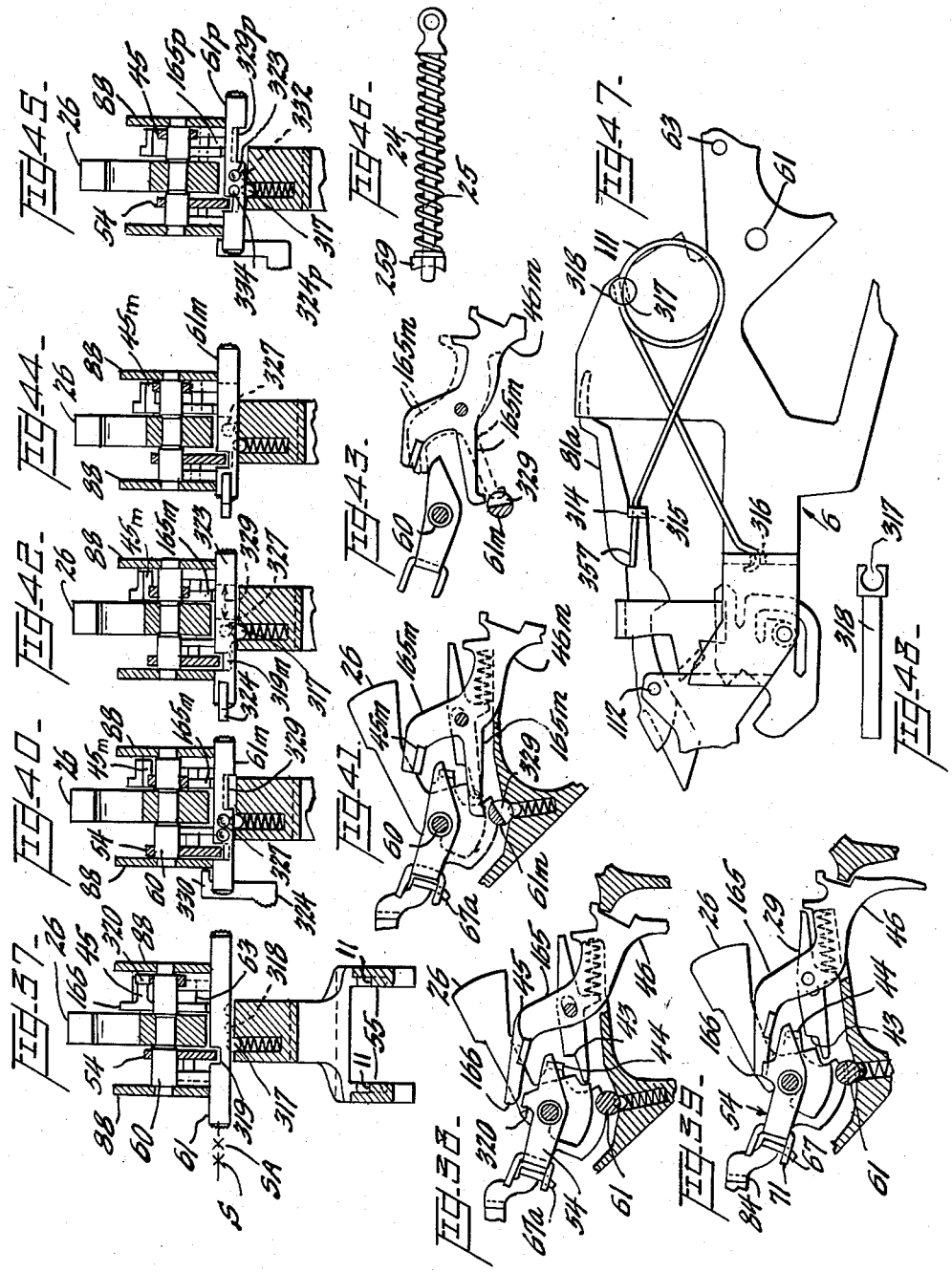

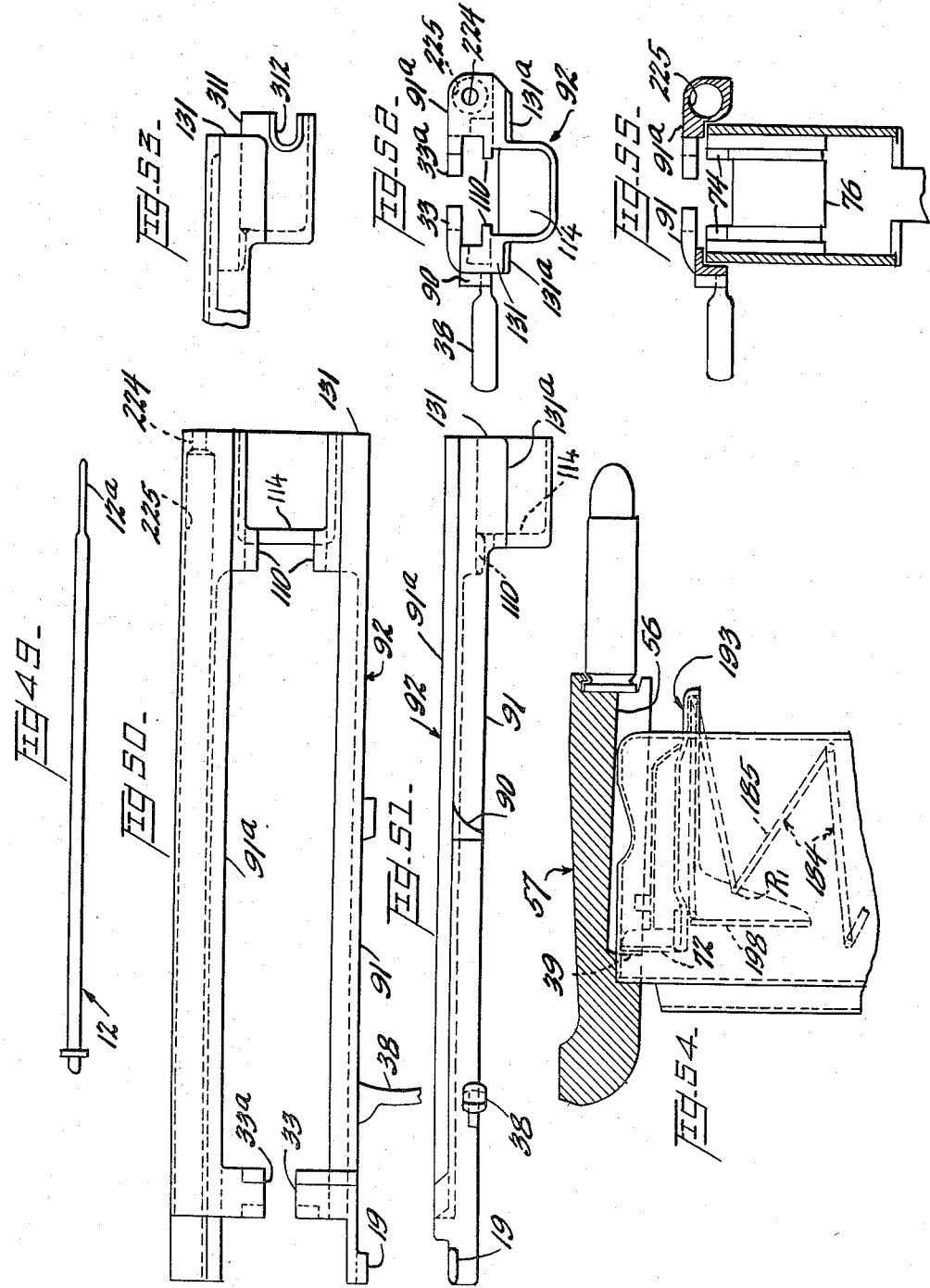

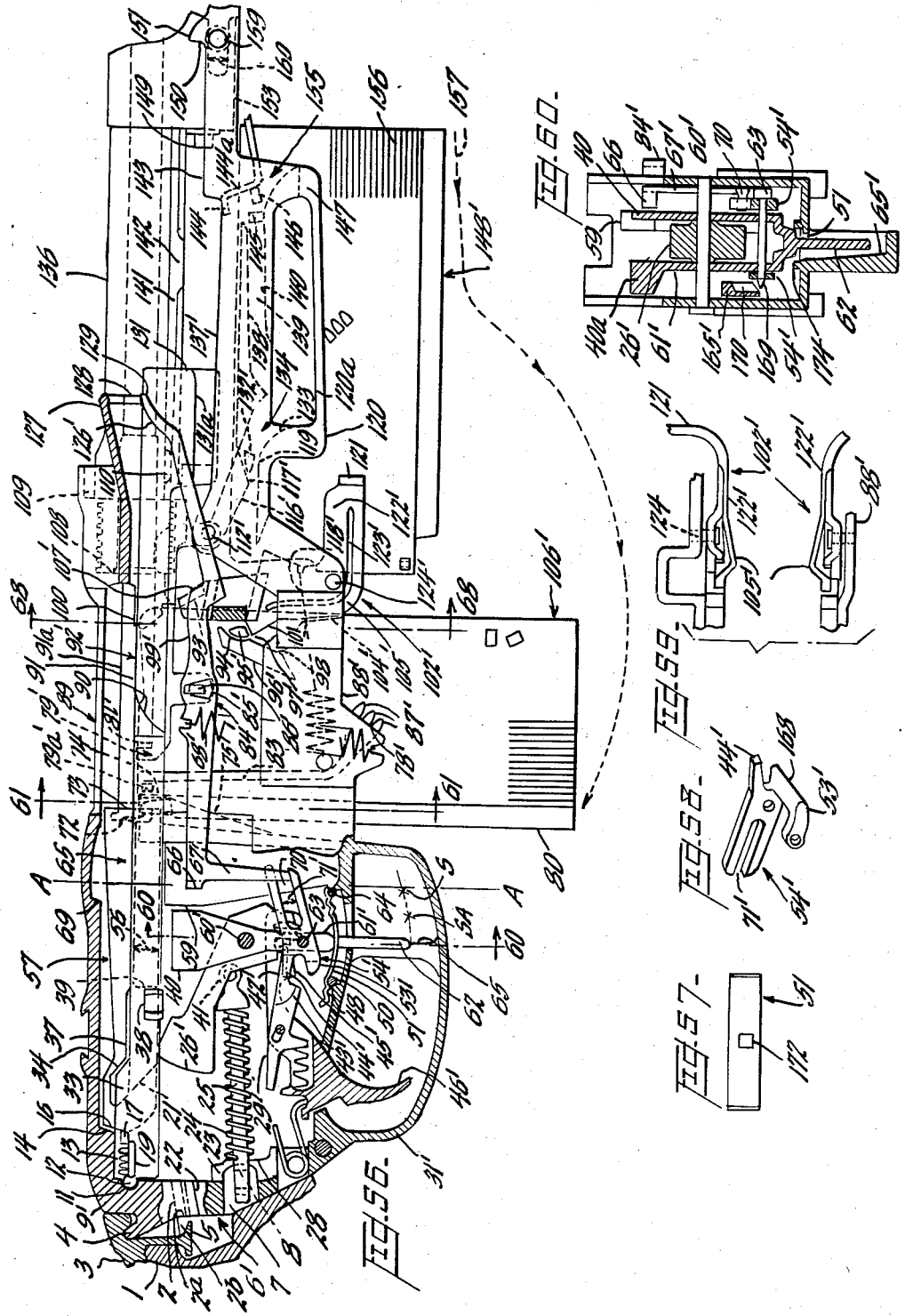

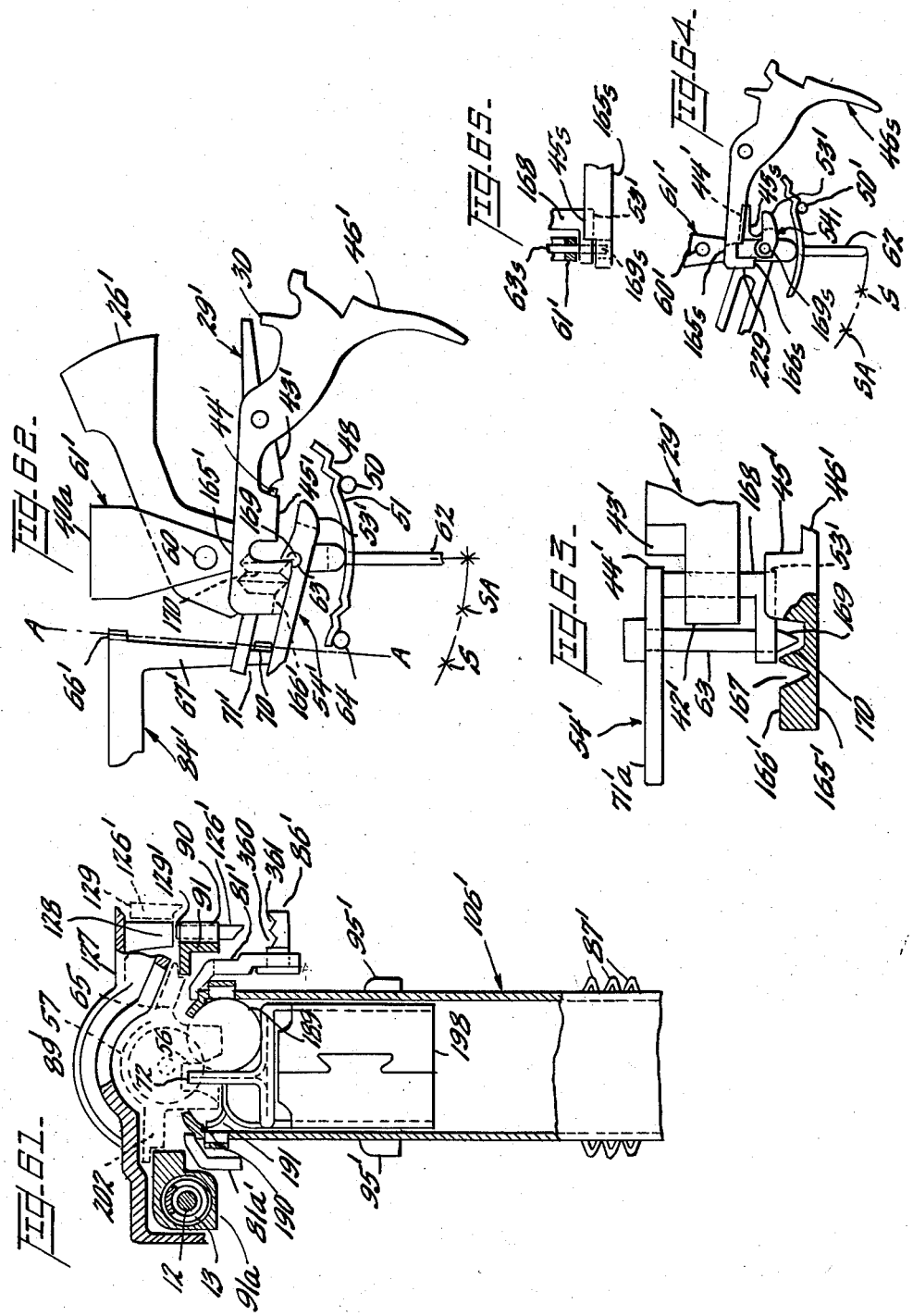

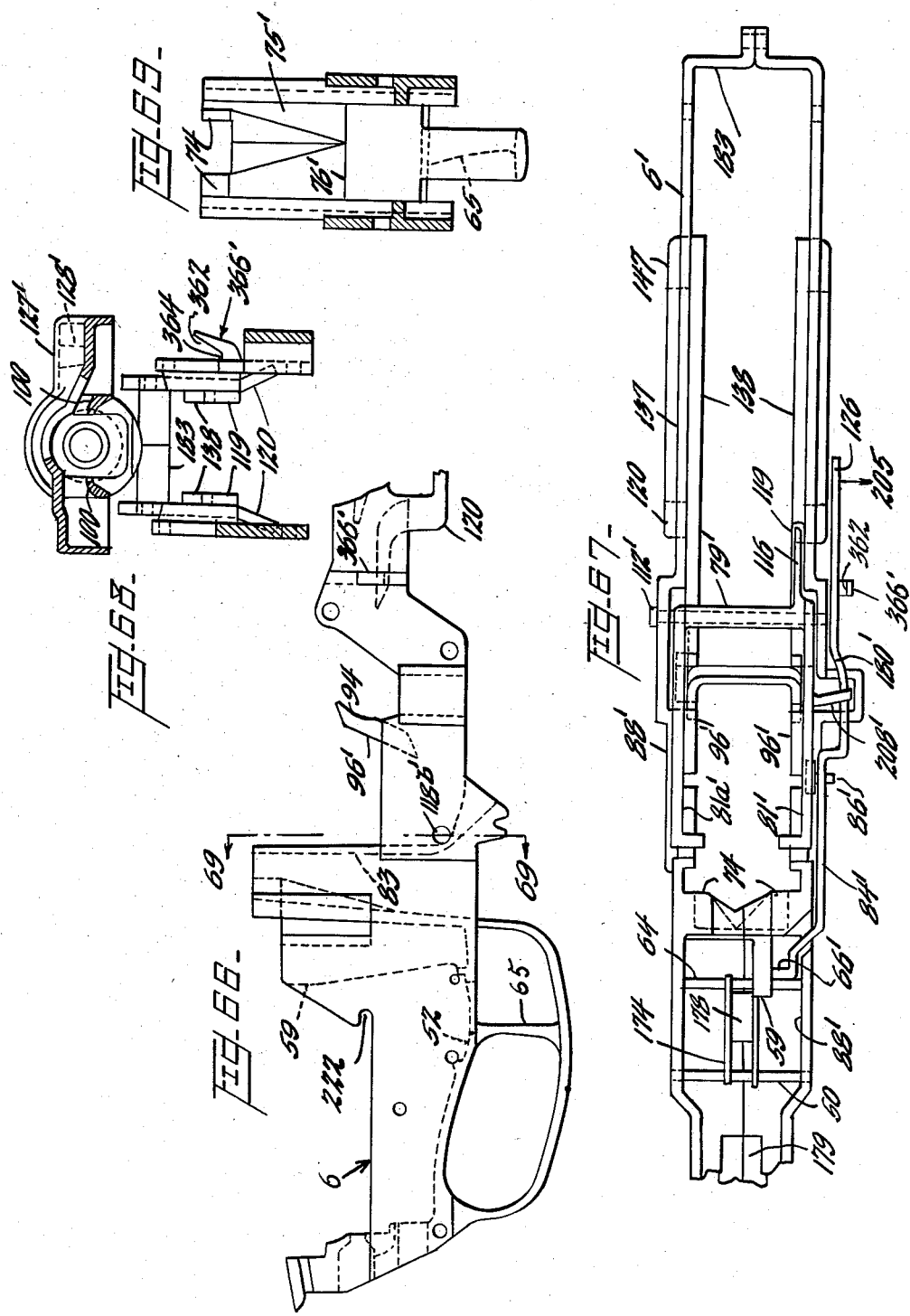

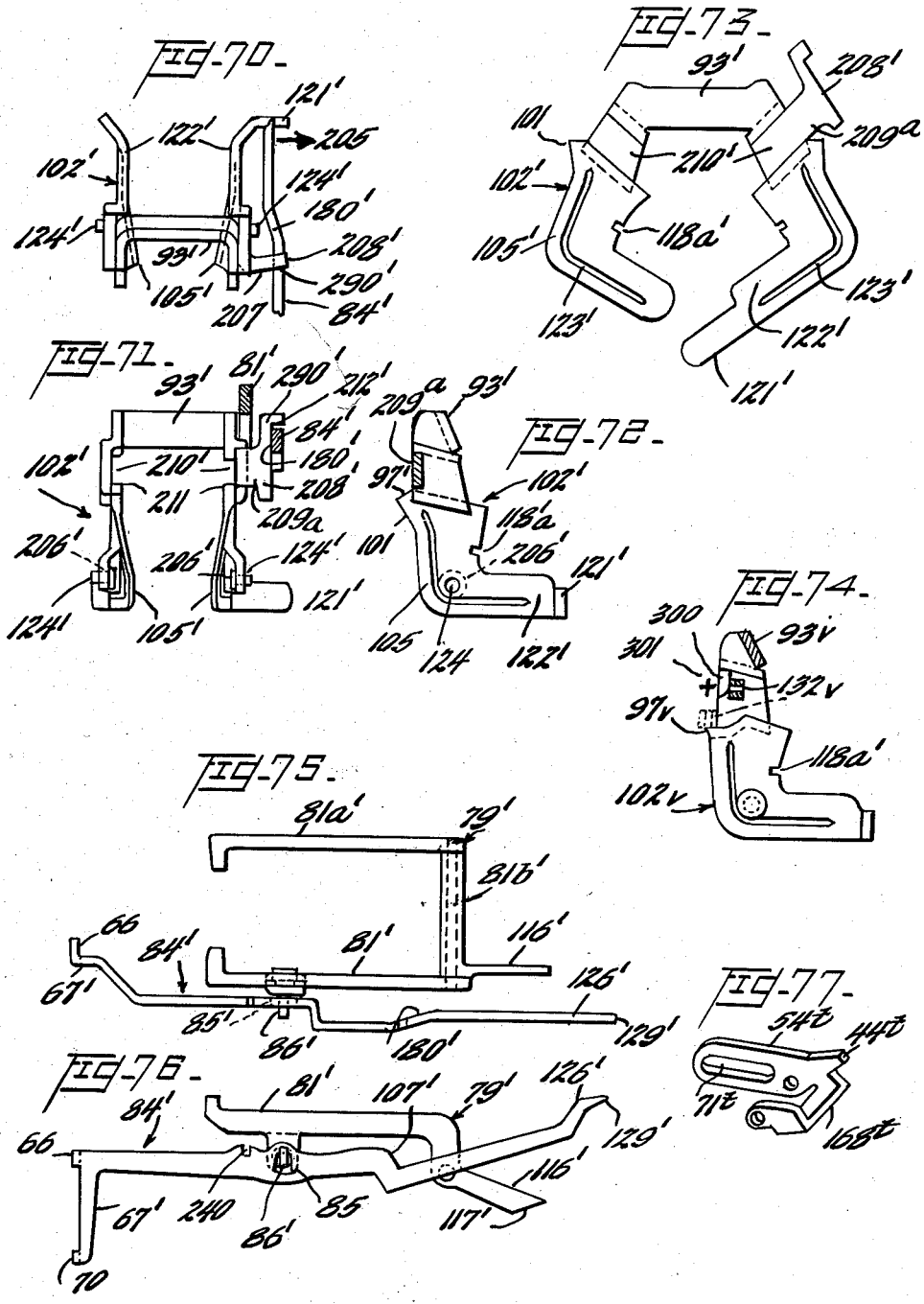

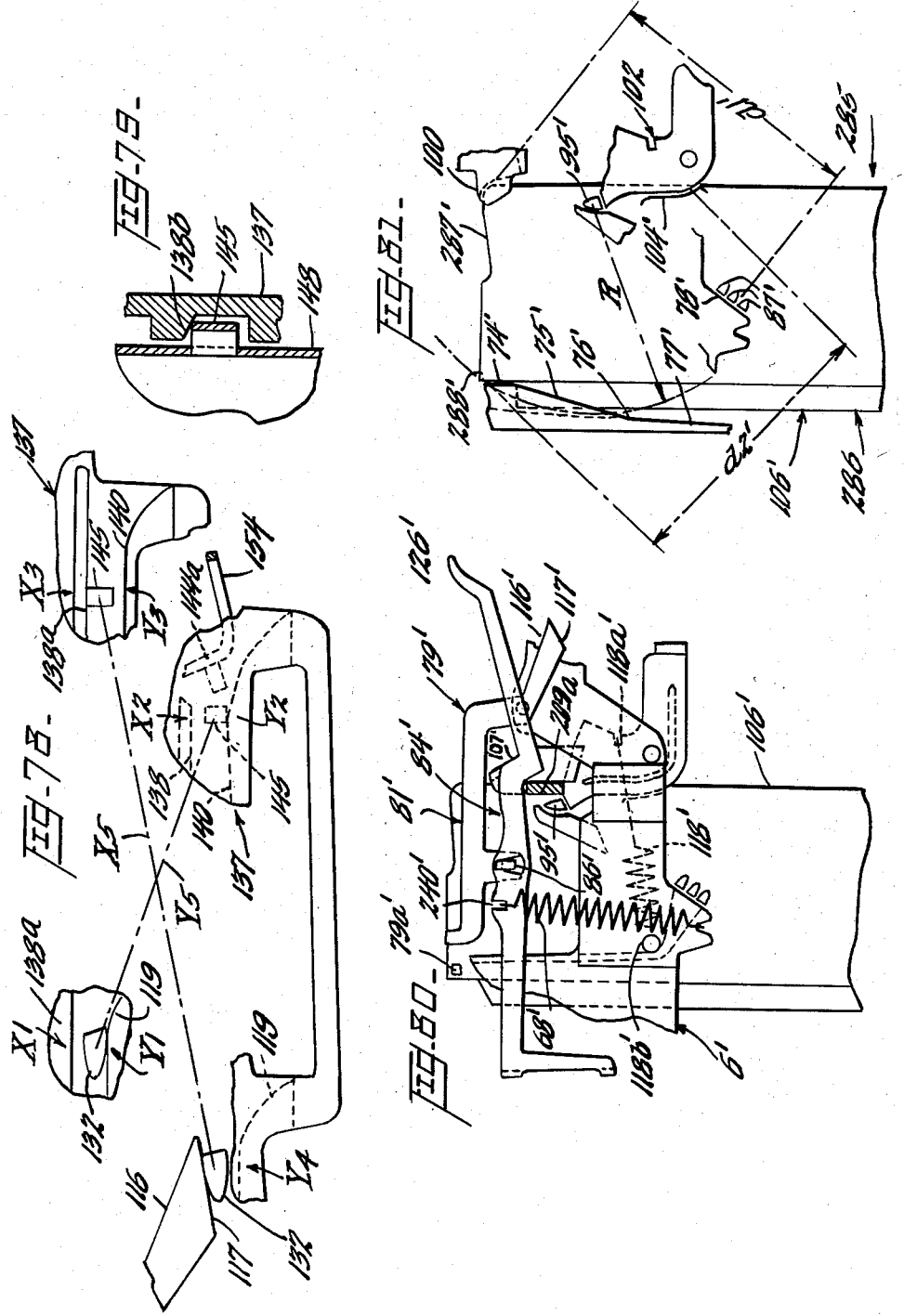

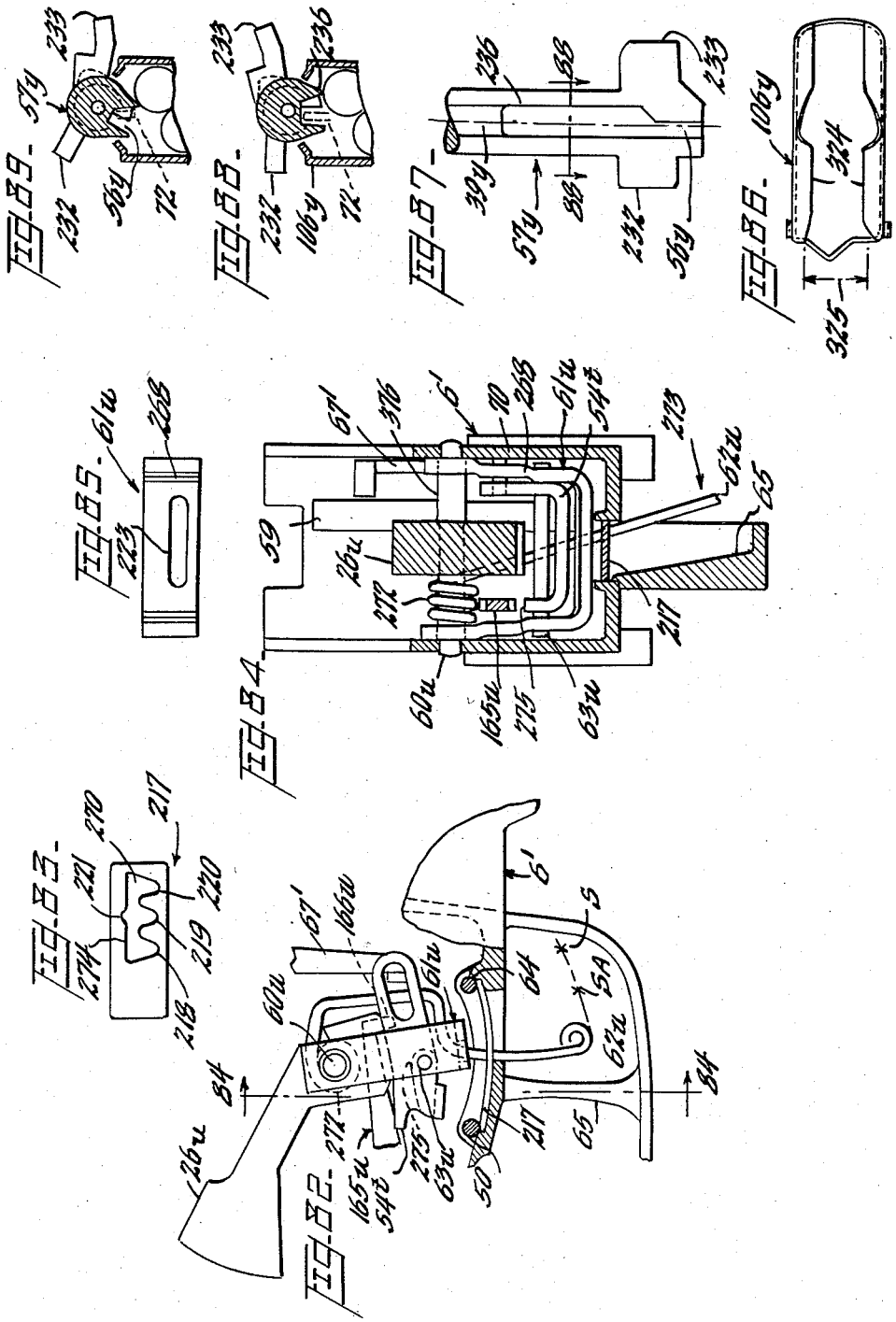

2,931,120

AUTOMATIC FIREARM WITH A SPARE MAGAZINE HOLDER

Jiri Kolinko, Utica, N.Y., now by change of name George Kolin

Application August 17, 1955, Serial No. 528,869

23 Claims. (Cl. 42—18)

This invention relates to magazine-fed automatic firearms and more particularly to such firearms designed so that upon loading of the last round the empty magazine is automatically ejected and the firing is automatically interrupted, whereby the last round may be saved in the chamber and firing may be immediately continued upon insertion of a new magazine without first recocking the firing mechanism and loading the first round manually.

One of the most notable disadvantages of magazine-fed automatic firearms arises from the fact that the large number of cartridges in the magazine and the rapidity of full-automatic fire make it virtually impossible to keep count of the expended cartridges. The result is that the operator can never predict exactly when his weapon will become empty and stop firing. The effect of an interruption of firing is further complicated in conventional firearms by the necessity of removing the empty magazine, inserting a new one and chambering one cartridge manually before firing can be continued. In critical close combat situations where the ability to deliver continuous fire is of utmost importance, the unpredictability and the length of the interruption of firing make the conventional weapons rather undependable. Accordingly, the general purpose of the present invention is to provide an automatic firearm in which the operator is always forewarned when only one more round is left in the firearm and in which the time required for replacing an empty magazine with a full one and resuming fire is only a fraction of that required in the case of conventional firearms.

In order to shorten the time required for changing magazines and resuming fire, the first action which must be made automatic is that of ejecting the empty magazine. Accordingly, a purpose of the invention is to provide a firearm in which the empty magazine is automatically ejected upon chambering of the last round. Automatic ejection of the empty magazine at the time of chambering the last round serves as a warning that only one more round may be fired unless a new magazine is inserted.

A second action which must be accelerated is that of replacing the empty magazine with a full magazine. Accordingly, a further purpose of the invention is to provide an automatic firearm having a spare magazine holder so that the spare magazine will be in a known position close to the magazine opening in the firearm.

It will be appreciated by those familiar with the operation of conventional magazine-fed firearms that the time required for insertion of a new magazine causes an appreciable delay in the firing. Accordingly, a further purpose of the invention is to provide a spare magazine holder so designed that a magazine can be transferred from the holder to the magazine chamber in a quick effortless movement which employs the magazine itself as a lever to overcome the force of the magazine spring and the force of the magazine ejector spring.

Several additional purposes accomplished by the spare magazine arrangement of this invention are, first, the provision of a spare magazine holder so arranged that a magazine secured therein does not extend any further below the firearm than does the magazine positioned in the usual magazine opening of the firearm; second, the provision of a spare magazine holder so arranged that when a magazine is secured therein the bottom portion of such magazine will rest comfortably on the operator's clinched left hand to support the firearm, for example, when firing in a prone position; third, in a modified form of the invention, the provision of a spare magazine holder which in no way interferes with the insertion of a magazine into the magazine opening in the conventional manner, so that a magazine may be inserted into the magazine chamber either directly or through the spare magazine holder; and, fourth, the provision of a spare magazine holder so designed that it will accommodate magazines of various lengths.

An additional purpose of this invention, which is related to the provision of a spare magazine holder, is to provide means for holding an empty magazine attached to the firearm after the ejection of such magazine. As will be appreciated by those familiar with the operation of automatic firearms, when an empty magazine is ejected it falls to the ground and often becomes lost or clogged with mud. Therefore, it is desirable to provide means for holding the empty magazine connected to the firearm after its ejection from the magazine chamber. A further purpose of the present invention is to provide means for holding the ejected magazine in a position so related to the position of the spare magazine holder that it is possible for the operator with one continuous motion of his right or left hand to first insert the spare magazine into the magazine chamber and next remove the ejected magazine from its holding means.

The second action which must be accelerated in order to decrease the time required to change magazines and resume firing is that of positioning the firing mechanism to resume firing immediately upon insertion of the new magazine. Accordingly, a further purpose of the present invention is to provide an arrangement whereby full-automatic firing is automatically interrupted upon chambering of the last round. The interruption of firing warns the operator that only one more round remains in the firearm and permits the operator to insert a new magazine before firing the last round, thus leaving the firearm cocked and entirely eliminating the time which is normally required for manually recocking the firing mechanism and loading the first round from the new magazine. A related purpose of the invention is to provide a firing mechanism so designed that if the firearm is in full-automatic setting and the trigger is held squeezed after ejection of the empty magazine, firing will resume instantaneously upon insertion of the new magazine without even requiring that the trigger be released and again squeezed.

As will be appreciated by those skilled in the use of automatic firearms, the most useful design is one in which the firearm may be used either in full-automatic setting or in semi-automatic setting, as it is sometimes more desirable to fire single accurately aimed shots than a rapid fire burst. Accordingly, a further purpose of the invention is to provide an automatic firearm which may be used either in full-automatic or semi-automatic setting. A further object of the invention is to provide a firearm having full- and semi-automatic settings in which the trigger tension is automatically increased upon chambering of the last round so that when the firearm is set for semi-automatic action the operator will be forewarned when only one round remains. The warning provided by the increased trigger tension is in addition to the warning caused by ejection of the empty magazine and is provided to cover instances in which the magazine ejection is not noticed by the operator or is prevented by some obstruction outside the firearm.

In the event that the operator's last magazine is the one in the magazine chamber, it is, of course, desirable for the operator to be able to fire the last round from the magazine without inserting a new magazine. Accordingly, a further purpose of the invention is to provide a firearm in which full-automatic firing is interrupted and trigger tension is increased upon chambering of the last round and yet firing can be resumed without first inserting a new magazine, so that the last round in the last magazine may be utilized.

A further purpose of the invention, which is related to the automatic interruption of firing, is to provide a firing mechanism designed so that firing is automatically interrupted and trigger tension is increased upon chambering of the last round regardless of whether or not the empty magazine is blocked by the ground or for some other reason is not properly ejected.

In firearms known prior to this invention, ejection of the empty magazine is triggered by the upward movement of the follower and the only force available for ejecting the magazine is that of the magazine spring. It will be appreciated that at the time of such ejection the magazine spring has expanded to the top of the magazine and its strength is decreased to a point where it may easily fail to provide the force required to release the magazine catch and eject the magazine, particularly if movement of the parts is hampered by extreme cold, sand or other binding influences. Accordingly, a further purpose of the present invention is to provide a firearm designed so that upon loading of the last round the forward motion of the bolt is utilized for triggering the automatic ejection of the empty magazine, and also for triggering the means for interrupting firing and increasing trigger tension. It will be appreciated that this arrangement avoids the problems discussed in connection with conventional firearms in which the magazine spring provides the only force for triggering the magazine ejection. With the arrangement of this invention, the fact that the magazine spring is almost fully expanded at the time of chambering the last round is a help rather than a hindrance because such weak action of the magazine spring makes it easier for the bolt to strip the last round from the magazine and thus leaves considerable energy in the forwardly moving bolt for releasing the magazine catch and for triggering the other automatic functions.

In connection with the design of firearms which are adjustable for full- or semi-automatic firing, it is desirable that there be no opportunity for the operator to be confused in thinking that the firearm is set for full-automatic firing when it is actually set for semi-automatic. Accordingly, a purpose of a modified form of the invention is to provide a fire control member which is movable from semi-automatic to full-automatic setting by a continuous rearward motion of the index finger and in which continued rearward motion of the finger positions it on the trigger in readiness to commence firing.

In any firearm it is desirable to provide a safety mechanism and the firearm of this invention is no exception. However, it is a purpose of the present invention to design the safety mechanism so that it is operated by the fire control member. Thus, in the present invention a single control member is capable of adjusting the firearm to any one of the three arrangements corresponding to safe, semi-automatic and full-automatic. A related purpose of a modified form of the invention is to arrange the fire selector and safety control member so that the forwardmost position thereof corresponds to the safe setting, the rearwardmost position corresponds to full-automatic, and the intermediate position corresponds to semi-automatic. Thus it will be seen that regardless of the setting of the fire selector and safety control the operator can quickly and surely set the firearm for full-automatic action by pulling the control member rearwardly to the full extent of its movement. A related purpose of the invention is to provide a fire selector and safety control member which is pivotally mounted in the firearm for easy actuation and at the same time is balanced about its pivot so that unintentional movement of the control member will not be caused by any impacts to which the firearm may be subjected, such as when the butt of the firearm strikes the ground upon rapid movement of the operator into the prone position.

A further purpose of the invention is to provide in an automatic firearm of the type described several modified forms of firing mechanism and modified forms of certain other parts, with said modified forms being so designed that they may be used interchangeably.

A further purpose of the invention is to provide a firearm of the type described in which the several parts of the firing mechanism, as well as various other parts, may be quickly and easily assembled and disassembled without requiring the use of special tools.

An additional purpose of the invention is to provide an automatic firearm of the type described which is adapted to function in the same manner when used either with a tilting-type bolt or a turning-type bolt.

Another purpose of the invention is to provide an automatic firearm of the type described in which relatively few moving parts are employed and in which various parts are specially designed for simplicity of manufacture. In particular, a purpose of the invention is to provide a design for and method of manufacturing the magazine catch so that it may be formed by the steps of stamping, flat milling, and bending.

A further purpose of the invention is to avoid the possibility of binding which results from the use of relatively weak compression spring and plunger assemblies, for example, the disconnector, spring and plunger assembly used in conventional firearms. In such spring and plunger assemblies, the many areas of contact between the plunger and the walls of the retaining hole tend to restrict movement of the spring to an extent which sometimes results in failure of spring action, particularly when extremely cold weather causes the lubricants to freeze or when dirt has accumulated on the parts. Accordingly, the invention contemplates the use of unsupported coil springs in place of spring and plunger assemblies.

Other and further purposes, features and advantages will be apparent from the following description to be read in connection with the accompanying drawings in which, Figure 1 is a side elevational view of the firearm showing the rearward portions of the trigger housing and barrel receiver in vertical section. In Figure 1 the trigger is shown in the release position and the bolt and the operating slide are shown in their rearward positions to which they have been driven by the usual gas operated piston;

Figure 2 is an exploded perspective view showing the manner of connecting the rearward ends of the trigger housing and barrel receiver;

Figure 3 is an exploded perspective view showing the details of the firing and fire-control mechanisms;

Figure 4 is a top plan view of the disconnector lever spring shown in Figure 1;

Figure 5 is a vertical sectional view showing the trigger in squeezed position and the other parts in the positions assumed prior to forward movement of the bolt and operating slide;

Figure 6 is a side elevational view similar to Figure 1 with the barrel and receiver group removed and showing the parts in the positions assumed after ejection of a magazine;

Figure 7 is a vertical sectional view through the magazine catch of Figure 1 showing the catch in release position preparatory to being moved into closed position upon the insertion of a magazine from the spare magazine holder into the magazine opening;

Figure 8 is a side elevational view of the magazine catch of Figure 1 showing the catch in the position assumed at the instant a magazine has been transferred from the spare magazine holder into the magazine opening;

Figure 9 is a side elevational view of the trigger housing with all other parts removed;

Figure 10 is a partial perspective view showing the far wall of the spare magazine holder of Figure 1;

Figure 11 is a partial top plan view of the trigger housing shown in Figure 9 with various parts inserted in the housing;

Figure 12 is a side elevational view of the barrel and receiver group shown in Figure 1 with the bolt and operating slide removed;

Figure 13 is a partial side elevational view of the trigger housing shown in Figure 1 with certain parts cut away and others removed to show the positions of the parts upon insertion of a magazine from the spare magazine holder into the magazine opening;

Figure 14 is a diagrammatic view illustrating various positions for the parts at two stages during transfer of a magazine from the spare magazine holder into the magazine opening;

Figure 15 is a side elevational view of the bolt;

Figure 16 is a front elevational view of the bolt shown in Figure 15;

Figure 17 is a top plan view of the magazine catch and showing a portion of the disconnector lever;

Figure 18 is an elevational view of the magazine catch looking from the rear of the firearm in Figure 1 and showing in vertical sections the magazine ejector and disconnector lever;

Figure 19 is a side elevational view of the magazine catch;

Figure 20 is a plan view of the blank from which the magazine catch is bent into the shape shown in Figure 18;

Figure 21 is a vertical sectional view of a portion of the firing mechanism shown in Figure 1 and disclosing in dotted lines an arrangement for removing the hammer spring and plunger unit;

Figure 22 is a partial elevational view looking toward the rear of the trigger housing shown in Figure 21;

Figure 23 is a side elevational view of a portion of the trigger housing shown in Figure 21 and disclosing a modified arrangement for removing the hammer spring and plunger assembly;

Figure 24 is a diagrammatic view showing another modification for removing the trigger spring and plunger assembly as a unit;

Figure 25 is a side elevational view of a portion of a modified trigger spring;

Figure 26 is a top plan view of the magazine ejector and disconnector lever;

Figure 27 is a side elevational view of the disconnector lever;

Figure 28 is a side elevational view of the ejector;

Figure 29 is a side elevational view of a portion of the trigger housing shown in Figure 1 and disclosing a modified arrangement for securing a magazine in the magazine opening;

Figure 30 is a horizontal sectional view taken on the line 30—30 of Figure 29;

Figure 31 is a side elevational view similar to Figure 19 but showing a modified form of magazine catch;

Figure 32 is a vertical sectional view on an enlarged scale taken on the line 32—32 in Figure 1 and showing in dotted lines the position of the bolt when moved to its forward position, and also showing in solid and in dotted lines two different positions for the forward end of the disconnector lever;

Figure 33 is a side elevational view of the magazine shown in Figure 1 with parts cut away;

Figure 34 is a top view of the magazine shown in Figure 33;

Figure 35 is a front elevational view of the magazine of Figure 33 with the magazine follower removed;

Figure 36 is a side elevational view of the rear portion of the magazine follower showing a step in the construction of the follower;

Figure 37 is a sectional view taken on the line 37—37 of Figure 1 showing the fire control mechanism set for full-automatic;

Figure 38 is a side view of the fire control mechanism similar to Figure 5 but viewing the mechanism from the left side of the firearm and showing the trigger in released position;

Figure 39 is a side view of the fire control mechanism similar to Figure 38 but showing the trigger in squeezed position;

Figure 40 is a sectional view similar to Figure 37 but showing a modified fire control mechanism in the safety position;

Figure 41 is a left side view of the fire control mechanism of Figure 40;

Figure 42 is a sectional view similar to Figure 40 but showing the modified control mechanism in the semi-automatic position;

Figure 43 is a left side view of a portion of the fire control mechanism shown in Figure 42;

Figure 44 is a sectional view similar to Figures 40 and 42 but showing the modified control mechanism in the full-automatic position;

Figure 45 is a sectional view similar to Figures 37 and 40 but showing a further modified fire control mechanism in the safety position;

Figure 46 is a side elevational view of a modified hammer spring and plunger assembly;

Figure 47 is a side elevational view of a portion of the firearm shown in Figure 1 and taken from the left side of the firearm;

Figure 48 is a front view of the hammer stop shown in Figure 47;

Figure 49 is a side elevational view of the plunger for the operating slide spring of Figure 1;

Figure 50 is a top plan view of the operating slide;

Figure 51 is a side elevational view of the operating slide;

Figure 52 is a front elevational view of the operating slide;

Figure 53 is a side elevational view showing the front portion of a modified operating slide;

Figure 54 is a side elevational view of the upper portion of the magazine showing the bolt in position after moving forward to chamber the last round;

Figure 55 is a vertical sectional view on the line 55—55 of Figure 9 and showing the operating slide in position;

Figure 56 is a side elevational view similar to Figure 1 but showing a modified firearm;

Figure 57 is a top view of a flat spring shown in Figure 56;

Figure 58 is a perspective view of the disconnector of Figure 56 as viewed from the left rear of Figure 56;

Figure 59 is a bottom view of a portion of Figure 56 showing the magazine catch. Upper portions of the magazine catch are omitted in this illustration;

Figure 60 is a vertical sectional view of the fire control mechanism of Figure 56 taken on the line 60—60 in Figure 56;

Figure 61 is a vertical sectional view taken on the line 61—61 in Figure 56 with several parts omitted and showing in dotted lines the position of the bolt when moved to its forward position. Figure 61 also shows in solid and in dotted lines two different positions for the forward end of the disconnector lever;

Figure 62 is an enlarged side elevational view of the firing and fire control mechanism of Figure 56 as viewed from the left of Figure 56;

Figure 63 is a top view of Figure 62 with parts removed to show only the disconnector and pin, and the forward portions of the trigger and sear;

Figure 64 is a side elevational view similar to Figure 62 but showing a modified form of fire control mechanism;

Figure 65 is a generally top view of a portion of the near side of Figure 64;

Figure 66 is a side elevational view of the rearward portion of the trigger housing of Figure 56;

Figure 67 is a top plan view of the forward portion of the trigger housing of Figure 56 and showing the disconnector lever and ejector in position;

Figure 68 is a vertical sectional view of the firearm of Figure 56 taken on the line 68—68 of Figure 56, with various parts removed;

Figure 69 is a vertical sectional view of the trigger housing taken on the line 69—69 of Figure 66;

Figure 70 is a top plan view of the magazine catch of Figure 56 showing the disconnector lever in position;

Figure 71 is an elevational view of the magazine catch of Figure 56 taken from the rear and showing in section the disconnector lever and the right arm of the magazine ejector;

Figure 72 is a side elevational view of the magazine catch of Figure 56 showing a portion of the catch in section;

Figure 73 is a plan view of the blank from which the magazine catch is bent into the shape shown in Figure 71;

Figure 74 is a vertical sectional view through the middle of a modified form of magazine catch for use in Figure 56. In Figure 74 a projection on the magazine is shown in solid section in the position it assumes during the later stage of movement of a magazine from the spare magazine holder into the magazine opening. In Figure 74 the magazine projection is also shown in dotted lines in the position it assumes after the magazine has been rotated into final position in the magazine opening;

Figure 75 is a top plan view of the magazine ejector and disconnector lever of Figure 56;

Figure 76 is a side elevational view of the magazine ejector and disconnector lever shown in Figure 75;

Figure 77 is a perspective view similar to Figure 58 but showing a modified form of disconnector;

Figure 78 is a diagrammatic view of the spare magazine holder of Figure 56 showing the magazine projections in position in the holder;

Figure 79 is a partial vertical section through the left front magazine projection seen in Figure 78 and showing a modified portion of the spare magazine holder;

Figure 80 is a side elevational view of the center portion of the trigger housing of Figure 66 with the magazine and other related parts in position;

Figure 81 is a diagrammatic view showing the path of travel of the upper rear edge of the magazine as it is rotated from the spare magazine holder into the vertical position in the magazine opening;

Figure 82 is an enlarged side elevational view of a modified fire control mechanism which may be substituted for the fire control mechanism of Figure 56;

Figure 83 is a top plan view of an element shown in Figure 82;

Figure 84 is a vertical sectional view on the line 84—84 in Figure 82;

Figure 85 is a top plan view of an element shown in Figure 84;

Figure 86 is a top plan view of a modified magazine for use with a turning bolt;

Figure 87 is a bottom plan view of the forward portion of a turning bolt which may be substituted for the tilting bolt of Figures 1 and 56;

Figure 88 is a vertical section through the bolt of Figure 87 on the line 88—88 with the bolt in unlocked position and showing a magazine in position below the bolt; and Figure 89 is a view similar to Figure 88 but showing the bolt in locked position.

Referring in more detail to the drawings, it will be seen that Figures 1 and 56 are substantially complete views of the two basic forms of the firearm. In order to help clarify the disclosure, the reference numerals in Figures 1 and 56 are substantially arranged in numerical order from left to right and top to bottom. In the following description all references to the left and right sides of the firearm are established by looking from the rear of the firearm unless otherwise explained.

The firearm illustrated in Figure 1 includes the barrel and receiver group 89 (Figures 1 and 12) and the trigger housing 6 (Figures 1 and 9). The barrel and receiver group comprises the barrel receiver 9 and the barrel 136 which is secured in the forward end of receiver 9. The stock group is of the type used in the well known U.S. carbines, cal. .30 M1 and M2, and was therefore omitted in this illustration with the exception of a small portion of the main stock 1.

In order to facilitate manufacture of the trigger housing 6, it is made in two separate halves which are then aligned at their rearward and forward ends by pins or plungers 351 and 352 (Figure 9). After the two halves are thus aligned, they are welded together to form the completed trigger housing. The rear of the trigger housing 6 (Figures 1 and 2) is attached to the rear of the barrel receiver 9 by two L-shaped lugs 22 on the receiver which engage corresponding recesses 164 (Figure 2) in the sides of the T-shaped lug 2 on the rear end of the trigger housing 6. The forward end of the trigger housing is attached to the barrel and receiver group 89 by a pin 159 passing through the forward end 152 of the trigger housing and through a slot 160 formed in the forward end of the gas cylinder 153. Said slot is open toward the front of the firearm as shown best in Figure 12.

As the lug 4 on the rearward end of the barrel receiver lockingly engages a corresponding recess in the recoil plate 3, with the lower lug 5 of the recoil plate engaging the rearwardly projecting lug 2b on the extreme end of the trigger housing, the laterally projecting portions 2a of the lug 2b are blocked by the upper portions of the L-shaped lugs 22, thus preventing the trigger housing from moving forward, while the lug 5 on the recoil plate 3 prevents the trigger housing from moving rearward. The lugs 22 and recesses 164 are inclined downwardly from front to rear in order to cooperate with lug 5 in preventing rearward movement of trigger housing 6 relative to barrel receiver 9. It will be understood that by virtue of this slantwise arrangement, rearward movement of trigger housing 6 would cam it downwardly and thus tighten the engagement between lugs 2b and 5 (Figure 1).

The trigger housing and the barrel receiver group may be disconnected as a unit from the stock in the same manner as in the U.S. M1 and M2 carbines by raising the forward end of the barrel and receiver group relative to the stock, thus releasing lug 4 from recoil plate 3. In order to disconnect the trigger housing from the barrel and receiver group, the trigger housing has to be pushed rearwardly to disengage the L-shaped lugs 22 from the recesses 164. As this is in progress, the rear edge 150 of the lip 151 which is formed on the forward end of the trigger housing engages the front 131 of the operating slide 92, making it necessary to force the operating slide to the rear in order to disengage the rear ends of the trigger housing and barrel receiver. In this connection, it should be noted that in Figure 1 the operating slide 92 is shown in the rearward position to which it has been driven by the plunger 149 of the gas cylinder 153. It will be obvious to those skilled in the art that in the forward or normal position to which the operating slide 92 is driven by spring 13, the transverse rib 114 (Figures 50–52) of the operating slide pushes plunger 149 forwardly and the end 131 of the operating slide occupies a position closely adjacent the edge 150 on the forward end of the trigger housing. In this manner, the operating slide spring 13 functions to prevent unintentional separation of the trigger housing from the barrel and receiver group.

Instead of forming lip 151 on the trigger housing, the same function can also be achieved by providing the operating slide 92 with a projection 311 extending forwardly from each side of the forward end 131 (Figure 53). It will be understood that extension 311 is located on each side of the slide 92 so as to pass between gas cylinder 153 and the inside of the forward end of trigger housing 6. As the trigger housing 6 is pushed rearwardly to be disconnected at its rear end from the barrel receiver group, the pin 159 (Figure 1), being engaged inside the notch 312 on the front end 311 (Figure 53) of the operating slide, bears against said end of the operating slide forcing said slide to move rearwardly as far as necessary in order to disengage the rear portions of the trigger housing from the corresponding portions of the barrel and receiver group.

After the rear of the trigger housing is disengaged from lugs 22 on the barrel receiver, the rearward end of the trigger housing may be shifted to a position below the lugs 22 by rotating the trigger housing about pin 159. The front end of the trigger housing can be then disengaged from the barrel and receiver group by pushing the trigger housing forwardly far enough to free the transverse pin 159 from the slot 160. The main reason for this arrangement is to allow the barrel to expand due to heat without causing strain on the trigger housing and further to allow the disconnecting of both groups from each other without removing pin 159 from the trigger housing, while the employment of the operating slide to block the rearward movement of the trigger housing prevents both groups from accidental disengagement during the removal of the stock.

The operating slide 92 (Figures 1, 32, 50, 51, 52), if viewed from the top of the firearm, resembles a rectangle having elongated sides 91 and 91a. The left side 91a is hollow and harbors the operating slide spring 13 (Figures 1 and 32) and the operating slide spring guide 12 (Figures 1 and 49) inside its hollow space 225. In order to facilitate the cleaning of the hollow space 225, an opening 224 is provided in its forward end.

Adjacent the rearward ends of both sides of the operating slide, lugs 33 and 33a, respectively, project toward the center and are received in the corresponding depressions 204 (Figure 15) which are formed one on each side of the bolt 57. The operating slide is reciprocably mounted in the barrel and receiver group 89 by means of two guide lugs 110 (Figures 1, 50, 51, 52) which are received in corresponding grooves 141 formed on the barrel (Figures 1 and 12) and by means of another lug 19 which is formed on the right side 91 of the operating slide and rides in a corresponding groove 19a (Figure 12) formed on the inside of the right wall of the receiver 9. A portion of the left side 91a of the operating slide rests on a rim 265 (Figure 12) which is formed on the left side of the receiver 9. The operating handle 38 is formed on the right side of the operating slide.

The bolt 57 (Figures 1, 15, 16, 32) includes the extractor 199 and ejector 200, ejector spring 201, laterally projecting lugs 65 and 202, by means of which the bolt rests on the operating slide (Figure 32) and firing pin 17 (Figure 1) inside the channel 203 (Figure 15). It will be noted that Figure 1 shows bolt 57 at its rearward position. As will be readily understood by those skilled in the art, the bolt is driven to its forward position by the operating slide and in such forward position the forward end 73 of the bolt jams the head of a cartridge into the enlarged recess 108 at the end of the cartridge chamber.

The locking of the bolt begins as the bolt stops at its forward position to which it has been driven by the operating slide. The locking action occurs as the operating slide, still continuing its forward movement, starts to slide with its lugs 33, 33a along the forward slant camming surfaces 34 bordering the depressions 204, thus forcing the bolt upward. The bolt is locked when the locking lug 16 at the rear end of the bolt engages the locking recess 69 formed in the upper portion of the barrel receiver group, shortly after which the operating slide reaches its forward position.

Withdrawal of the firing pin and unlocking of the bolt occur as the operating slide, during its rearward movement, engages the usual tang projecting to the right from the rear end of the firing pin 17 forcing it to the rear, while the lugs 33, 33a bearing against the slant camming surfaces 21, bordering the depressions 204 in the bolt, force the bolt downward thus unlocking it.

After the barrel and receiver group has been disconnected from the trigger housing as previously explained, the bolt and the operating slide can be removed from the barrel and receiver group by aligning the guide lugs 110 on the operating slide with the relief cuts 142 in the grooves 141 on the barrel, which automatically will put into alignment also the guide lug 19 (Figures 50, 51) on the rear end of the operating slide with the cut 358 (Figure 12) in the barrel receiver, thus permitting the operating slide to be lowered and removed from the receiver.

When the trigger housing is attached to the barral receiver group, the front of the operating slide is carried at the forward end of its movement by the elevated portions 143 of the trigger housing which engage the sliding surfaces 131a of the operating slide while farther to the rear the operating slide is carried by upper portions of the trigger housing adjacent to the rear end of the magazine opening (see Figure 55), thereby preventing guide lug 19 from engaging the relief cut 358.

The magazine ejector 79 of Figures 26 and 28 is made of one piece sheet metal by stamping and bending to form two arms 81 and 81a connected by a bridge 81b. A portion of the right arm 81 is bent to the outside to form a pivot 86 which supports a disconnector lever 84. The magazine ejector is pivoted on a transverse pin 112. A portion 81c of the left arm 81a is bent to the outside to keep said magazine ejector properly spaced from the side wall portion 313 (Figure 10) of the spare magazine holder 137.

The magazine ejector spring 111 (Figure 47) is biased with one of its ends in a slot 315 (see also Figures 26 and 28) formed on a laterally projecting portion 314 of the left arm of the magazine ejector and with the other end in a hole 316 formed in the side wall of the trigger housing 6 as shown also in Figure 11. It will be noted that Figure 47 is an elevational view of the trigger housing taken from the left side of the firearm. The center section of spring 111 forms a loop, and a portion of the loop passes through a slot 317 (Figure 48) formed on one end of the pin 318. It will be understood that the usual stock (not shown) fits along the side of trigger housing 6 so that spring 111 is held in place by slot 317, the outside of trigger housing 6 and the inside of the stock. When the stock is removed, the spring 111 is held in place by its elongated end 357 leaning against the side of the magazine ejector, thus preventing the spring from movement sideways out of the slot 317. Pin 318 also serves as a hammer stop as will be described in more detail hereinafter.

The disconnector lever 84 (Figures 1, 11, 26, 27) is pivoted on the pin 86 carried by ejector 79 and functions in the following manner. As the operating slide 92 moves forward, its inclined camming surface 90 (Figures 1, 50, 51) engages the toe 126 of the disconnector lever camming it down. The rear end of the disconnector lever is consequently caused to rise and thus actuate the disconnector 54 which disconnects the sear 29 from the hammer 26, as will be more fully described hereinafter.

The magazine catch 102 (Figures 1, 17, 18 and 19) consists of a one-piece body which is specifically designed so that it can be made by stamping from sheet metal. Figure 20 shows the catch 102 in its flat condition after the stamping process.

The only elements which must be added after stamping are two pivots 124, which are (with the collars 206, Figures 18 and 19) welded to the catch. In the upper portion of the magazine catch is a bridge 93 which forms a connection between the left side wall and the right side wall. As shown in Figure 18, the upper half of the magazine catch as indicated at 210 is wider than the lower half. In order to produce the sharp edges 211 at the border between the upper and lower half, the inner walls of the magazine catch are machine finished after the stamping process. In the lower portions of the side walls, slots 123 (Figure 19) are provided with partially separate narrow border portions 105 from the side walls. These narrow border portions are bent toward the center (see Figures 17 and 18) of the magazine catch and are relatively thin in profile which causes them to be resilient and act like a flat spring. These portions are employed here as a one-way catch as will be further described, and they will be referred to as "resilient" or "elastic" portions in the text of this description.

From the right side wall of catch 102 there projects farther to the right side a vertically rectangular formation 208 (Figures 17, 18, 19) with a slot 213. The rectangular formation 208 will be hereinafter termed "disconnector lever guide" since the disconnector lever 84 projects through the slot 213 and is guided therein for reasons which will be explained hereinafter. When mounted in the firearm, the magazine catch is located between the side walls 88 (Figure 1) of the trigger housing with the pivots 124 projecting through two corresponding holes 124b in the walls of the trigger housing.

Referring in more detail to the method of producing the magazine catch, Figure 20 illustrates the catch after being stamped from sheet metal. This is the first stamping step and in this step the slots 123 and 213 are formed. As shown in Figure 20 the catch is lying flat, with the inner side upward, since this side has to be finished by machining. The catch is further prepared by a second stamping step so that the particular portions which have to be made thinner in profile, for example the elastic portions 105, are elevated more than those portions which have to be thicker, and portions which need not be finished at all are left completely flat or depressed. As the catch is being passed under the machine tool, the depressed portions stay out of reach of said tool while the more or less elevated portions can be reduced to desired thickness in a single operation. Accordingly, it will be seen that the described method provides for very economic production of the magazine catch.

In order to remove the magazine catch 102 from the firearm, it is necessary to compress its bottom portions together so that both pivots 124 clear their receiving holes, after which the catch can be moved downwardly and removed from the firearm. The elasticity which is necessary to allow such compression is achieved by machining the upper portions of the catch to proper thickness.

In the magazine 106 for the new firearm, portions of the rounded corners 283 are edged at 104 (Figures 1, 33, 34, 35) for locking engagement with the elastic portions 105 of the magazine catch as will be more fully described hereinafter. The magazine is further provided with projections 79a, 80, 87, 95, 145, 146 (Figure 1) which serve various locking and guiding functions as will be described hereinafter.

The follower 193 (Figures 32, 33, 34) inside the magazine 106 is provided at its rearward end with a tang 72 which fits into the slot 56 (Figures 15, 16, 32, 54) which is formed in the bottom of the bolt as will be further described hereinafter. The tang 72 is received in slot 56 of bolt 57 when the follower has moved up to the top of magazine 106, and as the bolt moves forwardly the rear wall 39 of slot 56 strikes tang 72. The tang is formed by folding and erecting a flat portion on the rear end of the follower, as illustrated in Figure 36. Since the front edge 195 of the tang leans against the upper edge 194 (Figures 33, 36) of the rear end of the elevated portion 192 of the follower, the tang 72 is well supported, which considerably increases its firmness against shocks caused by the bolt during its forward movement.

The firearm disclosed in Figures 1 and 11 has the usual magazine opening formed between the side walls 88 on opposite sides of the trigger housing 6. A magazine 106 is shown in vertical position in the magazine opening and is locked against downward movement by the cooperating engagement between the projections 95 on each side of the magazine and the surfaces 97 on each side of the magazine catch 102. The firearm disclosed in Figure 1 also has a spare magazine holder positioned forwardly of the magazine opening, and a second or spare magazine 148 is shown horizontally positioned in the spare magazine holder. The magazine 106 is the magazine opening is identical with the spare magazine 148 in the spare magazine holder, the two reference numerals 106 and 148 being used to distinguish the two positions of the magazines and to maintain the helpful numbering system used in Figures 1 and 56. Similarly, the projections 132 on the spare magazine 148 are identical with the projections 95 on the magazine 106 in the magazine opening.

The spare magazine holder is formed by two outriggers 137 (Figures 1, 9 and 10) on the trigger housing 6, extending from the front end of the magazine opening to the front end of the gas cylinder 153. The inner walls of the spare magazine holder are provided with upper shoulders 138 (Figures 1, 9, 10) and lower shoulders 119 and 140. These shoulders provide guide grooves for projections 132 and 145 of the spare magazine 148. The lower shoulders 119 and 140 are longitudinally spaced from each other to allow the spare magazine 148 with its projections 132, 145 and 146 to enter the spare magazine holder as is indicated by arrows 134 and 155 (Figure 1). As indicated in Figures 9 and 10, the outriggers 137 are provided with downwardly projecting portions 120 and 147 which are connected by a bridge 120a and curved outwardly to facilitate insertion of the spare magazine between the outriggers.

In addition to the magazine opening and the spare magazine holder, the firearm is provided with an empty magazine retainer which is formed by a pair of spaced rails 55 on opposite sides of the trigger housing 6. The construction of the empty magazine retainer is shown best in Figures 1, 6, 9, 11 and 37. Rails 55 extend from shoulders 78 rearwardly to the bottom of the usual trigger guard 31. As shown best in Figure 11, the trigger housing walls 88 are thickened inwardly at 368 to permit formation of an entrance groove 82 (Figure 1) on each side of the firearm, which grooves provide a passage for projections 79a (Figures 1, 13, 14) on the magazine as will be fully described hereinafter. It will be understood that the distance between the outer edges of projections 79a is greater than the distance between the inside surfaces of rails 55, as indicated in Figure 11, so that when magazine 106 is ejected its projections 79a will be caught by rails 55. At their rearward ends, each of the rails 55 is provided with a groove 11 having an exit portion 10 (Figures 1 and 37) for purposes which will be hereinafter described in connection with the operation of the firearm.

While resting in the spare magazine holder, the magazine 148 is firmly secured in position by the spring 154 (Figures 1 and 11), which by means of its inclined portion 144a, acting against magazine projection 146, thrusts the magazine rearwardly so that the projection 132 on the right side of the magazine (looking from the top rear of the firearm) is held against the spare magazine release 116 (Figures 1, 26, 28) which is an integral part of the previously described magazine ejector. As shown in Figure 11, the intermediate portion of spring 154 is coiled around pin 159, and the forward end of the spring engages the top of the forward end 183 of the trigger housing 6. In order that the spring 154 will fit between the right outrigger 137 and the spare magazine 148, the wire of which said spring is made is rectangular in cross section as indicated in Figure 78. Since the spare magazine in the spare magazine holder is held exclusively at its projections, magazines of various lengths may be used in one and the same holder. In order to prevent the spare magazine from shaking inside the spare magazine holder 137 (Figure 1), the spare magazine is wedged in said holder by an arrangement which will be explained in connection with Figure 78.

Figure 78 is a diagrammatic view of the spare magazine holder which illustrates projections 132 and 145 on both sides of the spare magazine as they are situated when said magazine is resting inside the spare magazine holder (see also Figure 1). In Figure 78 only the portions of the spare magazine holder which are adjacent to said projections are shown. For better clearness the magazine proper is not shown in the illustration and the projections (from both sides of the magazine) are connected by several imaginary axes.

In the spare magazine holder (Figure 78) the portions Y1 and Y2 of the left lower shoulder 119 and the right lower shoulder 140, respectively, are slightly higher than the portions Y3 and Y4 of the left lower shoulder 140 and the right lower shoulder 119, respectively; and the portions X1 and X2 of the left upper shoulder 138a and the right upper shoulder 138, respectively, are higher than the portion X3 of the left upper shoulder 138a, which is diagonally opposite to the slanted end 117 of the spare magazine release 116.

As the spring 154 (Figures 1 and 78) by means of its inclined portion 144a pushes the spare magazine forward, with the projection 132 bearing against the slanted end 117 of the spare magazine release 116, the projections in Figure 78 which are connected by the diagonal axis Y5 engage only the lower shoulders, and the projections which are connected by the diagonal axis X5 engage only the portion X3 of the left upper shoulder 138a and the slanted end 117 of the spare magazine release 116. This arrangement secures the magazine against any movement up and down, forward and backward and against swinging from side to side. In order to secure the spare magazine against sliding sideways, a portion of the left lower shoulder at Y1 and a portion of the left upper shoulder at X3 can be made with a slanted camming surface. Such camming surface is indicated at 138b in Figure 79 which is a vertical section through the left outrigger 137 at the location X3 in Figure 78.

As shown in Figures 1, 6, 7, 8, 17, 18 and 19, the magazine catch 102 has forwardly extending side portions 122 which are bent outwardly at their ends. The side portion 122 on the right of the catch 102 is extended at 118a to form a handle for manual operation of the magazine catch. It may be seen in Figure 1 that if handle 118a is pressed down, the catch will rotate clockwise about pivot 124, thus moving catch surfaces 97 forwardly away from the magazine projection 95 and releasing the magazine 106 which is in the magazine opening (see also Figure 6). The side portions 122 of the magazine catch also serve to restrain sideways motion of the spare magazine after the spare magazine is released by upward movement of the spare magazine release 116. Further, the handle 118a is provided with a notch 118c (Figures 17 and 18) which receives one end of a bow spring 118, the other end of the spring being held by a notched projection 118b (Figures 1, 6 and 11) on portion 120 of the right outrigger 137.

The trigger housing 6 carries the firing and fire control mechanisms. In the firing mechanism of Figures 1, 3, 5, 37, 38 and 39 the trigger 46, the sear 29 and the hammer 26 all function in a well known manner as fully explained in the U.S. patent to Sampson et al. No. 2,465,487, issued March 29, 1949. However, in the present invention the safety switch and the fire selector are incorporated in one element 61 which is called the ",re control member" in the following text.

With the fire control member 61 in a position as illustrated in Figure 37 the firearm is in full-automatic setting. If, after the firing of a round, the trigger 46 is held in squeezed position as shown in Figures 5 and 39, the sear 29 stays forward as in the aforementioned patent to Sampson, and the raised shoulder 43 of the sear is then well within the reach of the inturned sear-tripping-finger 44 on the disconnector 54. As the operating slide moves forwardly to chamber another round, it depresses toe 126 at the forward end of the disconnector lever 84, thus causing lever 84 to rotate clockwise, as shown in Figure 1, about the pivot 86. Such clockwise movement causes the laterally extending arm 67 at the rearward end of the lever 84 to move upwardly against the force of spring 68. As the rearward end of the lever moves upwardly, its arm 67, positioned in a clawlike formation 71 (Figure 3) formed on the front end of the disconnector, causes said front end of the disconnector to move upwardly about the hammer pin 60, which will cause the sear-tripping-finger 44 to engage the raised shoulder 43 of the sear, tripping said sear downwardly and thus releasing the front end of the sear 42 from abutting engagement with the hammer.

In order to change the setting from full-automatic to semi-automatic, the fire control member 61 must be pushed to the left as viewed in Figure 37 (or to the right as viewed from the rear of the firearm), up to a point where the locking ball 317 engages the next succeeding locking recess 318 formed on the bottom of the fire control member, at which time the left end of member 61 in Figure 37 reaches the position SA. Since a portion of the disconnector 54 is engaged in a slot 319 formed in the fire control member, the disconnector 54 follows the movement of the member 61 as it moves to the position SA. As will be understood from an analysis of Figure 3, this movement of disconnector 54 causes the sear-tripping-finger 44 (Figure 3) to be withdrawn to the side out of reach of the raised shoulder 43 of the sear. In military versions of this firearm, it may be desirable to replace the locking ball 317 by a plunger because a ball is more apt to become lost during disassembly of the firearm under field conditions.

If the member 61 is pushed still farther to the left in Figure 37 until it reaches the position S, the raised portion 320 of the disconnector will be under the forward end 166 of the trigger extension 165, thus blocking movement of the trigger into squeezed position as will be apparent from an analysis of Figures 3, 37 and 38.

In order to prevent the member 61 from turning, the clearance between the bottom of the slot 319 in the member 61 and the under side of the disconnector 54 which is engaged therein is relatively small as shown in Figures 5 and 37. It will be noted that with the fire control mechanism shown in Figure 37 the setting can be readily changed from either the safe position S or the semi-automatic position SA into the full-automatic position in one straight movement by pushing the fire control member sideways.

Figures 40–44 illustrate a modified fire control mechanism which, with the exception of the safety arrangement, functions in a manner similar to the fire control mechanism previously described in connection with Figures 1,3,5,37, 38 and 39. In Figures 40–44 the parts which are substantially similar to those in the previously described fire control mechanism are designated by the same reference numerals with the addition of the suffix *m*. Parts which are entirely different are, of course, given new reference numerals.

In Figures 40–44 the fire control member 61*m* is provided with a lever 324. When lever 324 is rotated to the downward position shown in Figures 40 and 41, the forward lower edge of trigger extension 165*m* is blocked by a solid portion (Figure 41) of the control member 61*m*, thus preventing the firing. By rotating the lever rearwardly (counter-clockwise as shown in Figure 42) until the next locking recess 327 (Figures 40 and 42) is engaged by the locking ball 317, said solid portion is rotated out of reach of the trigger extension 165*m*, causing the trigger extension to be free to move into the slot 329 (Figure 43) thus unlocking the trigger. With the member 61*m* in the position shown in Figure 42, the sear-tripping-finger 44 (Figure 3) is positioned sideways out of engagement with the raised shoulder 43 on the sear 29. As a result, rotary movement of disconnector 54 will have no effect on sear 29, and the firearm will fire semi-automatically if the trigger is squeezed. With the member 61*m* pushed farther to the left side of the firearm into the position shown in Figure 44, the sear-tripping-finger can engage the raised shoulder of the sear and the weapon will fire full-automatically in case the trigger is held squeezed.

In order to prevent the control member 61*m* from being pushed to the left side of the firearm while set on the safety position as shown in Figure 40, the lever 324 is provided with an abutment 330 which engages the sidewall 88 of the trigger housing. When the setting is changed to semi- or full-automatic, as shown in Figures 42 and 44, respectively, said abutment 330 is facing a recess (not shown) which is provided on the under side of the trigger housing for the purpose of allowing the member 61*m* to be pushed to the left side of the firearm. As a result, the operator can be certain that whenever he rotates lever 324 upwardly from the safety setting shown in Figure 40, the firearm is in semi-automatic setting, not full-automatic.

Another modified fire control mechanism is shown in Figure 45 in which parts which are similar to those in Figures 40–44 are designated by the same reference numerals with the exception that the suffix *p* is used. In Figure 45 the lever 324*p* does not have any abutment such as the abutment 330 in Figure 40. In addition, the fire control member 61*p* has an additional locking recess 334. This arrangement gives a choice of two different safety positions, one with the lever 324*p* downward and with the member 61*p* pushed to the left side of the firearm into the position shown in Figure 45, and another safe position with the control member pushed to the right side of the firearm, again with the lever 324*p* pointing downwardly. It will be understood that in both of these safety positions, squeezing of the trigger is prevented by engagement of trigger extension 165*p* with the solid portion of member 61*p* in a manner similar to that explained for Figure 41. If the member 61*p* is pushed to the left side of the firearm and set on safe (with the lever 324*p* pointing downwardly), full-automatic fire can be opened by flipping the lever 324*p* upward and squeezing the trigger. In case the firearm is in the alternate safety position (with the lever pointing downwardly and with the member 61*p* pushed to the right of the firearm), the setting can be changed from this safe position to full-automatic by flipping the lever 324*p* upward and simultaneously pushing the lever and the member 61*p* to the left side of the firearm which unlocks said member from the recess 332 and locks it in the recess 334. Thus the change from either of the two alternate safety positions to full-automatic can be performed in one uninterrupted movement of control member 61*p*. It will be understood that when control member 61*p* is pushed toward the left side of the firearm into the position shown in Figure 45 but with lever 324*p* horizontal, full-automatic operation is obtained for the reasons explained in connection with Figures 3, 37 and 39; that is, the sear-tripping-finger 44 on disconnector 54 is positioned directly above shoulder 43 on sear 29.

It will be understood that the fire control mechanism of Figure 45 will be in semi-automatic position when control member 61*p* is moved to the right side of the firearm and lever 324*p* is rotated upwardly so that ball 317 is received in recess 323. When thus positioned, the control member 61*p* places disconnector 54 to the right of the firearm so that the sear-tripping-finger 44 will oscillate ineffectively to the right side of shoulder 43 on sear 29, so that the firearm will operate semi-automatically as previously explained in connection with the fire control mechanism of Figures 3 and 37. If the firearm is in semi-automatic setting, full-automatic fire can be obtained by pushing member 61*p* one stop to the left side of the firearm. Thus, in the modification shown in Figure 45, full automatic fire, which in a close combat engagement is always preferred to semi-automatic fire, can be quickly obtained by moving the switch no more than one stop regardless of whether the previous setting was semi-automatic or either of the two alternate safety positions.

In order to prevent the hammer 26 as well as the hammer pin 60 (Figure 3) from any movement sideways, portions 376 (Figure 3) of said pin are enlarged to block such movement. It will be noted that the disconnector 54 is specially designed so that it can be made inexpensively by stamping from sheet metal with additional bending. Further, in the previously described modifications of the fire control mechanisms, all parts, with the exception of the fire control member and the trigger are interchangeable.

In general, the main advantage offered by the fire control mechanism of Figures 37–39 rests in the simplicity of operation, that is, only axial movement is required for control member 61. The main advantage of the fire control mechanisms of Figures 40–45 rests in the fact that the latter can be fitted into a smaller space because the control members 61*m* and 61*p* rotate for one position and therefore need only two positions for axial movement.

In order to facilitate the disassembly of the firing and fire control mechanisms, the hammer spring plunger 25 (Figure 21) is associated with the rear wall 28 (Figures 1 and 21) of trigger housing 6 in the following manner. The wall 28 is provided with a bore or recess 7 therein to receive the rearward end of plunger 25, and in the forward face of wall 28, a groove 23 extends across the open end of recess 7, as shown in Figure 22. The purpose of groove 23 is to allow the end of the operating slide spring guide 12 (Figure 21) or other pin-like body to be inserted into one of several holes 8 provided in the plunger 25 (or in other equivalent means for guiding hammer spring 24). As indicated in Figure 21, the end 12*a* of guide 12 may be inserted in one of the holes 8. Then as the hammer is rotated forwardly, the end 12*a* of the operating slide spring guide 12 engages the rearward end of the hammer spring 24 and prevents further forward movement of said plunger inside the hammer spring, thus locking the spring on the plunger. With the hammer spring locked, the forward end 41 of the plunger can be effortlessly unseated from the hammer by rotating the hammer farther forward by hand, after which the plunger and hammer spring can be removed from the trigger housing as a unit, as is demonstrated by the dotted showing in Figure 21.

It is important to provide sufficient space under plunger 25 to allow the end 12*a* of the operating slide spring guide to be inserted into the hole 8 so far that a sufficiently long portion thereof will protrude as shown in Figure 21 and can be used for displacing pins from holes while the hammer spring and plunger are locked on said guide. As shown in Figures 21 and 22, groove 23 extends vertically across recess 7. However, it will be understood that the same function would be accomplished if groove 23 were horizontal as shown at 23a in Figure 23, or at some other angle, provided that the holes in the plunger are arranged at the same angle as the groove.

In order to provide for the occasional need for separating the hammer spring 24 from the plunger 25, provision is made for removing the spring and plunger assembly from the firearm with the spring expanded as far as possible toward the rear of the plunger, so that when the operating slide spring guide 12 is removed from the plunger the spring will be more easily handled and less apt to fly off the plunger with destructive force. Accordingly, a hole 353 is provided adjacent the rearward end of plunger 25. It will be understood from Figure 21 that when hammer 26 is rotated clockwise into engagement with pin 318 (shown also in Figures 47 and 48), the hole 353 will be positioned in groove 23, permitting insertion of spring guide 12. However, the spring and plunger assembly cannot be removed because the forward end of plunger 25 is received in the recess 365 in the hammer. It is for this reason that hammer stop, pin 318, has been made removable. Obviously, when pin 318 is removed, the hammer 26 can be rotated farther clockwise to release the spring and plunger assembly. However, it will be noted that if the tension of the thus locked spring is still too great, a longer plunger can be provided, so that the hole 353 can be placed farther to the rear, in which case hole 353 will not reach groove 23 when hammer 26 rests against pin 318. Accordingly, pin 318 must be removed and hammer 26 eased forwardly until hole 353 reaches groove 23, and then spring guide 12 can be inserted.

The preceding arrangement also permits the use of a hammer spring which is permanently locked on the plunger 25 by means such as a short pin 259 (Figure 46) fixed in one of the holes 8 or 353 (Figure 21), so that the operating spring guide 12 need not be used for locking the spring before removing it from the trigger housing. However, since the unlocking of a permanently locked spring is rather difficult to perform without the use of special tools, the arrangement using the operating slide spring guide for locking the spring is considered preferable.

The slot 23 (Figures 21 and 22) instead of being machined in the trigger housing can also be provided by means of a spacing washer 277 (Figure 24) placed between the wall 28 of the trigger housing and the rear end of the hammer spring 24. Said slot is designated by the numeral 23b. The washer 277 is provided with flanged ends 278 which serve as a seat for the end of spring 24 and also extend outwardly into engagement with the sidewalls of the trigger housing to hold the washer in an upright position.

Instead of using slots 23 or other means for maintaining a portion of the plunger accessible for inserting a pin-like body into a hole provided in said plunger, the steepness of a portion 279 (Figure 25) of the helix of the spring 24b can be increased. In cases where steepness of said helix should be increased up to a point where the wire would be almost or completely parallel with the axis of the plunger 25, said wire can be prevented from slipping to one side by forming a segment-like hook 281 on its end, which will keep the wire attached to the plunger and provide ample surface for engagement with the rear wall of trigger housing 6.

The hammer 26 (Figures 3 and 21) is provided with a slot 215 which permits removal of said hammer without removing the pin 60 from the trigger housing. Further, the hammer pin 60 may be carried in the sidewalls of the trigger housing 6 in slots 222 (Figure 9) instead of in the usual holes, so that the hammer pin can be removed from trigger housing with the disconnector attached to it. Thus, the hammer pin and the disconnector can be easily disassembled and assembled in the open instead of in the cramped space in the trigger housing.

*Automatic ejection of empty magazine and interruption of automatic firing upon chambering of the last round*

As the bolt 57 moves forward chambering the last round, the tang 72 (Figures 1, 32, 33, 34 and 54) of the follower 193 reaches deep into the slot 56 in the bottom of the bolt 57 (Figures 1, 15, 16, 32 and 54) and is caught by the solid portion 39 of the bolt, at the end of the slot 56. As the bolt continues its forward motion, the follower is pushed through the opening 197 (Figures 33, 34 and 35) in the front of the magazine, against the downwardly projecting bend 93a provided in the center section of the bridge 93 (Figure 18 and 19) of the magazine catch 102, forcing the top of the catch to rotate to the front which results in the release of the magazine 106 at the projections 95 (Figure 1); so that the magazine ejector spring 111 (Figure 47) will rotate the arms 81, 81a of the ejector 79 downwardly to forcibly eject the magazine 106. Magazine catch 102 is shown in locking position in Figure 1. As will be readily understood by those skilled in the art, the catch is in release position when its top portion has been rotated forwardly far enough to remove catch surfaces 97 from beneath magazine projections 95. Catch 102 is shown in release position in Figure 6. The bowspring 118 yieldingly locks the catch in either the locking position as shown in Figure 1 or the release position as shown in Figure 6. When the ejection of the empty magazine progresses far enough to cause the tang 72 of the follower to be disconnected from the bolt, the magazine spring 184 will retract the follower to the center of the magazine. Figure 54 shows follower 193 in the forward position to which it is driven by bolt 57. As shown in Figures 33 and 54, the coil 185 of spring 184 is shortened to permit the spring deformation shown in Figure 54.

At the same time that the magazine catch is rotated forwardly, the disconnector lever guide 208 (Figures 17 and 18) presses against one side 180 of the curved portion of the disconnector lever 84, causing its forward end with the toe 126 to move to one side (as indicated by the arrow 205 in Figures 11 and 17) out of reach of the camming surface 90 (Figure 1) on the operating slide. This action results in the interruption of automatic firing because the disconnector lever 84 will not be rotated by operating slide 92 to cause the automatic firing as previously explained. In order to prevent the toe 126 (Figure 1) as well as the whole disconnector lever from wobbling about its longitudinal axis, the rear end of the disconnector lever is provided with the lateral arm 67 (Figures 1, 3, 11, 26) which is engaged in a clawlike formation 71 (Figure 3) formed on the front end of the disconnector 54. This engagement, by maintaining the arm 67 in a horizontal position, consequently also maintains the whole disconnector lever including the toe 126 in the vertical position. Further, as the disconnector lever guide 208 pushes the disconnector lever 84 aside (as indicated by the arrow 205 in Figures 11 and 17) only the front end with the toe 126 can follow this movement, since the rear end of the disconnector lever with the arm 67 is prevented from moving sideways by the sidewalls 88 (Figure 11) of the trigger housing.

*Increase in trigger tension upon ejection of empty magazine 106*

If the ejection of the empty magazine is not blocked from the outside and progresses properly, the magazine ejector 79 (Figures 1 and 6) while ejecting the empty magazine simultaneously moves the pin 86 downward and thus permits downward movement of disconnector lever 84 by spring 68, as shown in Figure 6. During the first part of its downward travel, both ends of lever 84 move down until the lever is lowered to a point where the downward movement of the forward end 126 of the lever is stopped by a laterally protruding portion 366 (Figures 6, 9 and 11) on the spare magazine holder, after which, now with increased speed, the downward movement of the rear end of the disconnector lever rotates the disconnector 54, causing the left rear end 53 (Figures 3 and 6) of the disconnector to bear against the laterally projecting portion 45 on the forward end of the trigger, which being felt by the finger, especially while releasing said trigger in order to fire again, serves as a warning that the empty magazine was ejected and that only one more round remains in the chamber. Another factor which will serve as a warning that only one round remains is that when an attempt is made to squeeze the trigger again, the usual slack resistance felt while squeezing the trigger before the trigger engages the rear end 29a of the sear becomes much stronger upon the chambering of the last round. This increase in trigger tension occurs when the firearm is set for full-automatic as well as semi-automatic action. However, when firing full-automatically this warning is not needed, since the automatic interruption of firing provides a warning that cannot be overlooked, except in the event that the trigger is released at the same time that the rifle stops firing due to chambering of the last round. Since undue pressure of the arm 67 against the bottom portion of the claws 71 would render it increasingly difficult to change the setting from semi-automatic to full-automatic, or vice-versa when there is no magazine in the firearm, said arm may be provided with a tang 67a (Figure 6) which will limit the downward movement of said arm and prevent said arm from causing excessive pressure on the disconnector 54.

*Automatic release of spare magazine 148 as magazine 106 is ejected*

As the magazine ejector 79 ejects the empty magazine 106, the forward end 116 of the ejector (Figures 1, 6, 26 and 28), which end will be called "spare magazine release," simultaneously rises upward to the position shown in Figure 6, thus releasing the projection 132 (Figure 1) on the right side of the spare magazine. One advantage offered by the slanted ending 117 (Figure 1) of the spare magazine release is that in case the spare magazine should be thrust against the spare magazine release, the ejection of the empty magazine not only will not be blocked, as it would if the ending was arranged vertically, but the ejection will actually be aided if such pressure has been exercised. In order to prevent the spare magazine from becoming completely loose after the magazine release 116 rises upward, a hook 144 is provided on the end of the spring 154 which engages the projection 146 as the magazine is moved forward.

*Firing of last round without insertion of new magazine*

After chambering of the last round and ejection of the empty magazine 106 it may be desirable to fire the last round without inserting a new magazine in the magazine opening. As previously explained, the ejection of the empty magazine 106 is accompanied by an increase in the trigger tension caused by downward movement of the rear portion 67 of disconnector lever 84 under the influence of spring 68. Assuming that the fire control member 61 is set at the semi-automatic position SA described in connection with Figure 37 and assuming that magazine 106 has been ejected, then the trigger tension is increased by the force of spring 68. The last round may then be fired simply by releasing trigger 46 and squeezing it again against the added force of spring 68. Similarly, if the fire control member 61 is set at the full-automatic position as shown in Figure 37, the last round may be fired by releasing trigger 46 and squeezing it again against the added force of spring 68. The reason why trigger 46 must be released before firing the last round even at full-automatic setting is that when the last round was chambered, the automatic firing function of disconnector lever 84 was interrupted as previously explained.

*Interruption of automatic firing and increase of trigger tension as affected by failure of magazine ejection*

When firing in the prone position, it could easily happen that there would be no clearance under the magazine which is due to be ejected. In all cases where the ejection of the empty magazine is accidentally blocked from the outside, the chambering of the last round will still interrupt full-automatic firing in the manner previously explained. However, blocking of the magazine does cause a slightly different action for increasing the trigger tension.

As the disconnector lever guide 208 (Figures 17, 18 and 19) is driven forward by follower 193 (Figures 33 and 54), it pushes the forward end of the disconnector lever 84 sideways out from under cam 90 on the operating slide 92 (Figure 1). It will be understood that when the last round is chambered, slide 92 will be in its forward position with cam 90 directly above the forward toe 126 of lever 84. Then the disconnector lever, being driven by the force of the spring 68 (Figure 1) starts to rotate about the pivot 86 and as its forward end moves upward, the step 107 (Figures 1 and 27) which is provided on the disconnector lever, blocks the disconnector lever guide at its top 290 (Figure 18), thus serving as a safeguard to prevent the magazine catch from being closed unintentionally by hand before the empty magazine is ejected. At the same time as the forward end of the disconnector lever 84 moves upward, the rear end moves downward, causing the disconnector to rotate to the point where the left rear end 53 (Figures 1, 3 and 6) of the disconnector engages the lateral projection 45 on the forward end 165 of the trigger if the fire control member 61 is set for either semi-automatic or full-automatic action. In order to fire the firearm again, it is necessary to release the trigger completely which, due to the action of the spring 68, will cause the left rear end of the disconnector to follow the upward moving projection 45 on the trigger. Now, in order to squeeze the trigger again, it will be necessary to overcome the force of the spring 68, plus the increase of resistance resulting from the new position of the disconnector. The increased resistance at the trigger will serve as a warning that a new magazine should be inserted before firing the last round. Being so warned, all the operator has to do is to provide clearance under the empty magazine which can easily be done by leaning the firearm somewhat to one side, allowing the ejector to eject the empty magazine. As a new magazine is inserted, the disconnector lever and the front end of the disconnector are forced back up to their original positions, thus causing the trigger tension to become normal again. If it should be desirable to fire the last round before turning the firearm (when in prone position) to permit complete ejection of magazine 106, the round may be fired by releasing trigger 46 and squeezing it again against the added force of spring 68.

If the ejection of the empty magazine is prevented and the last round is fired while the empty magazine is still in the weapon, the follower 193 which at the time has been held upward by spring 184 may fail to follow the rearward movement of the bolt 57 quickly enough, and as the bolt moves to the rear, it will pass completely behind the follower, releasing tang 72 from the slot 56. Being thus released, the follower is free to move upwardly into the path of the bolt where later during the forward movement of bolt 57 it will be caught by the solid portions of the face 73 (Figure 16) of the bolt above the slot 56 and with considerable force thrust against the bend 93a of the bridge 93 (Figures 17 and 18) of the magazine catch. In order to protect the follower 193 against damage, the follower is provided near its rear end 198 with an abutment stop 191 (Figures 32, 33, 34) which after the chambering of the last round engages a cornice 190 (Figure 32) formed in the retaining lips of the magazine, thus preventing the follower from moving farther upward.

*Insertion of spare magazine 148 into the magazine opening*

In order to transfer the spare magazine from the spare magazine holder to the magazine opening, the empty magazine 106 must, of course, be ejected from the magazine opening. Ejection of empty magazine 106 from the magazine opening is accomplished either automatically upon chambering of the last round as previously explained, or manually by depressing handle 118a on the magazine catch 102. In either case the magazine ejector 79 rotates counterclockwise about pin 112 (Figure 1) in ejecting magazine 106, and the spare magazine release 116 is thus raised from the locking position shown in Figure 1 to a release position shown in Figure 6 in which the magazine release is above the projection 132 on spare magazine 148. As will be apparent from an examination of Figures 1, 10, 11, 18 and 78, a passageway or channel for spare magazine 148 is formed by the spaced walls 137 of the spare magazine holder, the spaced sides 210 of the magazine catch, and the spaced sides 88 of the magazine opening.

After the empty magazine 106 is ejected, the spare magazine 148 may be transferred through said passageway or channel into the magazine opening as will now be described. Magazine 148 is grasped with the hand on the rough portion 156 and pushed with a straight rearward motion toward the magazine catch 102 (following the straight portion of dashed line 157 in Figure 1). As the magazine progresses with its projections 132 along the ribs 119 (one on each side of the firearm) towards the magazine catch, the projection 132 on the left side of the magazine bears against an inwardly bent catch-closing abutment 335 (Figures 7, 17 and 18) on the left side of the magazine catch, forcing the magazine catch 102 to rotate forwardly into the position shown in Figure 8. As previously mentioned, bow spring 118 (Figures 1 and 6), with one end biased on a laterally projecting portion 118a of the catch and the other end on a laterally projecting portion 118b of the spare magazine holder, yieldingly locks the magazine catch either in the locking position in Figure 1 or the release positioning of Figure 6.

As the magazine progresses still farther rearward, it is stopped at its projections 132 by downwardly projecting abutments 96 (Figure 13) which are formed one on each arm 81 and 81a of the magazine ejector 79 (Figure 28). These abutments 96, together with the shoulders 211 on magazine catch 102 (Figures 13 and 18), form an abutment crotch which serves as a pivot point for magazine projections 132. At this point the magazine is rotated about its projections 132 into a vertical position, following the curved portion of dashed line 157 in Figure 1. During the first part of the rotary movement, magazine projections 79a pass upwardly through the grooves 82 as will be understood from Figures 13 and 14. As the magazine is rotated farther clockwise in Figure 14, its projections 79a engage the rearward end of the magazine ejector 79 rotating it upward about the pivot 112. As the ejector reaches the position shown dotted in Figure 14, the abutment 96 is high enough to allow the projection 132 to pass farther to the rear into the position 95. As this occurs, further rotation of the magazine is prevented by engagement of its projections 87 with the ribs 78 on the trigger housing and by engagement of its upper front portions 287 with a pair of abutments 100 on barrel receiver group 89 as shown in Figures 1, 12 and 14. Further, as the magazine passes into vertical position, its edged portions 104 pass rearwardly between elastic portions 105 of the catch 102, after which the elastic portions return to their former gauge (see Figures 17 and 18) thus blocking the edged portions 104 and securing the magazine to its new position. The projections 80 prevent the magazine from being pushed upward and the projections 95 prevent it from falling downward.

The exact way in which the magazine is fixed inside the magazine opening will be explained in connection with Figure 14. Jolting forces which might act on the magazine and tend to cause undesirable movement of the magazine are indicated by the arrows 285 and 286. The forces which are acting in the direction indicated by the arrow 285 are resisted by the magazine at its projections 87 and at its upper front portions 287 which are held in place by the abutments 100. The distance between these points is marked $d1$ and exceeds one-half of the total length of the magazine. Thus, ample leverage is provided between points 87 and 287 for resisting the forces acting along line 285. In order to obtain similar results against forces acting in the opposite direction (indicated by arrow 286) the rear wall 75 of the magazine opening is so contoured that its uppermost portion 74 forms a straight vertical line, thus serving at that point as a firm support for the upper rear corner 288 of the magazine, and the distance $d2$ between the rear upper corner 288 and the edged portions 104 is substantially the same as the distance $d1$ It may happen that inaccuracy in production will cause the clearance between the lower edge 346 (Figure 8) of the inwardly bent portion 335 of the magazine catch and the rearward end 347 of the rib 119 to be too small, thus obstructing the projection 132 (Figure 7) while passing through said clearance after the magazine catch is rotated into vertical position. In order to eliminate this possible obstruction, the magazine catch 102 is allowed to rotate considerably farther to the rear than it is necessary for keeping the magazine locked inside the magazine opening (compare Figures 1 and 8), so that the projection 132 (Figure 7) can pass to the rear towards the magazine opening in any case without obstruction. After the projection 132 passes to the rear, the magazine catch is brought back to the vertical position when the upper portion of the forward edge of the magazine engages bridge 93 on the magazine catch (Figures 1, 17 and 18) during rotation of the magazine into its vertical position.

Instead of elastic portions 105, a one-way catch 337 (Figures 29 and 30) may be provided. Catch 337 is pivotally mounted on a pin 338 near the shoulder 78r which functions the same as shoulder 78 of Figures 1 and 14. A portion of a magazine wall is shown in section at 106r in Figure 30. The projections 87r are the same as the projections 87 of Figures 13 and 14 except that the projections 87r of Figures 29 and 30 are provided with 90 degree edges at both ends so they will prevent forward as well as rearward movement of magazine 106r. As the magazine is rotated into vertical position in the magazine opening, the projections 87r enter the one-way catch 337 as indicated by arrow 340, causing the catch to rotate about the pin 338 against the action of the helical springs 341 and 342. When projections 87r pass the hook-like end 343 of the catch 337, being at the same time stopped by the ribs 87r, the catch 337 returns to its original position, thus locking the magazine at its projections 87r to its vertical position inside the magazine opening. The upper end of the pin 338 is provided with a hole 344, which serves to hold the lower end of the disconnector lever spring 68 (Figure 29). At the same time spring 68 prevents the pin 338 from falling downwardly.

It will be noted that the one-way catch 337 can be inexpensively made from long bars prefabricated to have the same profile as the catch shown in section view of Figure 30. Such bars may be drilled to provide the holes for springs 341, 342 and for the pin 338, and cut transversely into separate catches by a tool which at the same time cuts out the recess 345 (Figure 29). If one-way catch 337 is employed, the elastic portions 105 (Figure 19) of the magazine catch 102 are not needed, and the pivots 124 (Figure 19) can be moved farther to the rear 124c (Figure 31).

The advantage of the slanted arrangement of projections 87 and 87r (Figures 1 and 29, respectively) and the slanted arrangement of supporting shoulders 78 and 78r rests in the fact that the magazine becomes completely loose immediately at the beginning of the ejection. Thus the magazine can in no way stick fast in the magazine opening. Therefore, the ejection becomes much smoother and may allow use of a weaker spring for the magazine ejector. For the same reason the edged portions 104 on the magazine are arranged slantwise. In addition, the magazine ejector is provided with two arms 81 and 81a (Figures 26 and 32) to guide the magazine during the ejection and thus eliminate any possibility of friction between the magazine and the side walls of the magazine opening.

*Resumption of automatic firing upon insertion of new magazine into magazine opening*

In situations where the main objective is to maintain a rapid rate of fire, the present firearm is particularly useful because full-automatic firing may be resumed simultaneously with insertion of a new magazine. In order to have the firing automatically resumed simultaneously with insertion of a new magazine, it is necessary that the fire control member 61 be in the full-automatic position shown in Figure 37, and that trigger 46 be kept squeezed after the firing is temporarily interrupted when the last round was chambered and the empty magazine 106 ejected. Assuming that trigger 46 has been kept squeezed, the insertion of a new magazine in the magazine opening will automatically cause firing to resume in the following manner. The spare magazine 148 is moved rearwardly into the magazine opening and as it is rotated into the vertical position, it forces magazine ejector 79 upwardly. As previously explained, magazine ejector 79 carries the pin 86 on which the disconnector lever 84 is mounted, so that as the ejector 79 is forced upwardly the lever 84 also moves upwardly. It will be understood that with operating slide 92 in its forward position and with the magazine catch in locking position, the cam 90 of the operating slide is in vertical alignment with toe 126 on the disconnector lever 84. Then, as insertion of the new magazine causes upward movement of pin 86, lever 84 is raised until its toe 126 engages the under surface of cam 90, so that during the final inserting movement of the magazine, upward movement of pin 86 causes the rear portion 67 of lever 84 to move upwardly against the force of spring 68. As previously explained, upward movement of rear portion 67 of the disconnector lever causes the disconnector 54 to rotate counter-clockwise (Figure 5) and disconnect sear 29 from holding engagement with hammer 26, thus effecting a resumption of full-automatic firing. However, it will be noted that if the trigger is not held back, the firearm will not fire because, as previously explained, the raised shoulder 43 of the sear is out of reach of the inturned sear-tripping-finger 44 (Figure 1).

In order to prevent the disconnector lever 84 from bearing with its upper portion 99 (Figure 1) against the upper border 212 (Figures 18 and 20) of the slot 213 of the disconnector lever guide, which might result in increased wear of these areas, especially the disconnector lever guide, the toe 126 of the disconnector lever is provided with an extension 129 (Figure 1) which bears against a portion 128 of the housing 127 which is formed on one side of the barrel receiver group 89. Should the disconnector lever guide 208 move the forward end 126 of the disconnector lever aside from the solid position indicated in Figure 32, the extension 129 will slip off the portion 128. Thus the disconnector lever guide will move with its forward end 126 upward to the dotted position in case the ejection of the empty magazine is blocked.

*Empty magazine retainer*

Referring now to Figure 1 it will be understood that when holding the firearm in the usual firing position as shown in Figure 1, as the magazine 106 in the magazine opening is ejected, it will fall downwardly until its projections 79a catch on the rails 55 which form the empty magazine retainer. If the firearm is used in prone position and has to be leaned sideways so that the ground would not obstruct the ejection of magazine 106, then the magazine 106 will be in a generally horizontal position, projecting to the side instead of downward, and may not be ejected far enough to reach the rails 55. It will be understood from Figure 1 that when the magazine 148 in the spare magazine holder is rotated rearwardly into the magazine opening, it will strike the ejected magazine and force it rearwardly towards the exit portions 10 into the position shown in dotted lines, regardless of whether the ejected magazine reached the rails 55 at the time of ejection or not, since the slanted surface 77 on the under side of the trigger housing will cam the magazine towards the exit portions 10 from any position below the rear ends of the arms 81 and 81a of the magazine ejector.

It should be noted that when the ejected magazine reaches the position shown dotted in Figure 1, the rear edge of tang 72 on the magazine follower 193 (Figure 33) engages the under surface of the trigger guard 31 and thus prevents the magazine from accidentally engaging the exit portions and falling out of the empty magazine retainer. In order to remove the magazine from the retainer, the magazine must be rotated and moved rearwardly into the position shown by dot-dash lines in Figure 1, in which position the tang 72 has been depressed [into the magazine] against the force of spring 184 (Figure 33). In the position shown in dot-dash lines in Figure 1, projections 79a are in the exit portions 10 of grooves 11 and the magazine may be withdrawn rearwardly out of the empty magazine retainer. It will be understood from Figure 1 that the insertion of the spare magazine and removal of the ejected magazine can be accomplished quickly in one continuous hand motion. The magazine in the spare magazine holder is grasped at the rough portion 156 and moved rearwardly along line 157 into vertical position in the magazine opening. As the magazine locks in the vertical position, the operator's hand slips off and continues rearwardly to grip the empty magazine located in the dotted position. Finally, continued rearward motion of the hand removes the empty magazine from the empty magazine retainer through the position shown in dot-dash lines.

*Modified firearm Figures 56–89*

The firearm of Figure 56 is a modification of the firearm of Figure 1, and in Figure 56 primed reference numerals are used to indicate the parts which are similar to the parts disclosed in connection with the firearm of Figure 1. The main purpose in providing the modified firearm of Figure 56 is to disclose a firearm having all the features of the one disclosed in Figure 1, except for the spare magazine retainer, and yet permitting insertion of a magazine directly into the magazine opening in the manner followed with the U.S. M1 and M2 carbines. It will be understood that in the firearm of Figure 1, the provision of the empty magazine retainer prevents insertion of a magazine into the magazine opening in any way except through the spare magazine holder. Even if the empty magazine retainer were removed, it still would be impractical to insert the magazine from the bottom because after each such insertion, the magazine catch of Figure 1 would have to be closed manually.

The firearm of Figure 56 functions in basically the same manner as the firearm shown in Figure 1. For this reason the following text will describe fully only such parts and functions of the firearm of Figure 56 which differ from those disclosed in connection with the firearm of Figure 1.

The magazine ejector 79' (Figures 75 and 76) consists of one integral part which includes two arms 81', 81a', a tubular body 81b', and the spare magazine release 116'. On the right arm 81' a pivot pin 86' is fixed. In the pivot pin 86' notches 360 and 361 (Figure 61) are provided for a purpose which will be hereinafter described. The entire magazine ejector 79' is pivoted on a transverse pin 112' (Figure 56) which projects through the tubular body 81b' and is carried in the side walls 88' of the trigger housing.

The disconnector lever 84' (Figures 56, 75 and 76) is pivoted on the pin 86' carried by the ejector 79', and is operated by the spring 68' (Figures 1 and 80). It will be noted that in the firearm of Figure 56 spring 68' (Figures 56 and 80) operates the disconnector lever as well as the magazine ejector. The separate ejector spring 111 (Figure 47) has been omitted in the firearm of Figure 56. The disconnector lever may be seated on the pivot pin 86' either in the left notch 360 (Figure 61), which will cause the toe 126' on the forward end of the lever to be within the reach of the camming surface 90 of the operating slide, or in the right notch 361 with the toe 126' out of reach of the camming surface 90. As long as the magazine ejector is upward, the tension of the spring secures the disconnector lever to its position in either of said notches, thus eliminating any free side movements of lever 84'. In order to prevent the disconnector lever from wobbling from side to side, its rearward end is provided with a vertical arm 67' (Figures 56 and 76) instead of the lateral arm 67 provided on the disconnector lever of Figure 1.

The magazine catch 102' (Figures 56, 70, 71 and 72) of the modified firearm is basically the same as the one employed in firearm of Figure 1, with the exception of a differently shaped bridge 93', the omission of abutment 335 shown in Figure 18 so that a through channel 210' (Figure 71) is provided in each side wall of catch 102', and the use of an open disconnector lever guide 208'. In Figures 56, 72 and 80 the magazine catch 102' is shown with the disconnector lever guide 208' broken away along its supporting arm 209a.

The magazine catch spring 118' (Figures 56 and 80), is a flattened helical spring and is guided along the inner side of the side wall of the magazine opening. One end of said spring is anchored in the hole 118b' (Figure 80) and the other end on the magazine catch in the notch 118a'. Spring 118' continues as a straight wire in all places where the width of the spring helix would interfere with the projection 95' of the magazine 106' during the ejection of said magazine.

As in the case of Figure 1, the trigger housing 6' of Figure 56 carries the firing and fire control mechanisms. In the firing mechanism shown in Figures 56, 60, 62 and 63 the trigger 46', the sear 29' and the hammer 26', as in previously described fire control mechanisms, all function in a well known manner as fully explained in the U.S. patent to Sampson et al. No. 2,465,487, issued March 29, 1949. Further, the fire control mechanism consists of an assembly of parts including a fire control member 61' which is movable selectively to any one of three positions corresponding to safe, semi-automatic, and full-automatic.

The fire control assembly comprises a disconnector 54', a flat spring 51 (see also Figure 57), and the fire control member or lever 61' which has a freely accessible finger piece 62. The fire control member 61' pivots about the hammer pin 60' and pivotally supports the disconnector 54' by means of another pin 63. The arrangement in Figure 63 is shown with the fire control member removed. The finger piece 62 of the control member projects through a hole 172 (Figure 57) in the flat spring 51. The flat spring is formed on one end or on both ends with corrugations 48 (Figures 56, 62) which engage the pin 50 so that any free movements of the control lever are prevented. The flat spring 51 also serves as a closure for the opening 179 (Figure 67) in the bottom of the trigger housing, and thus restricts the infiltration of dust and dirt.

The shape of the disconnector 54' will be best apparent from Figure 58 and from Figure 63 which is a partial top view of Figure 62 showing only the disconnector 54' and the forward portions of the sear 29' and trigger 46'. The numeral 71' indicates the forward end of the disconnector; 53' is the left rear end; 44' indicates the right rear end; and 168 indicates a bridge which connects the right rear end with the left rear end. Numeral 42' indicates the front end of the sear, and 165' is the forward end of the trigger.

In front view, the shape of the fire control member 61' resembles the shape of the letter Y (see Figure 60) with the upper portion enlarged to form counterweights 40 and 40a (Figures 56, 60, 62) which counterbalance the weight of the lower portions of the control lever which are below the hammer pin 60', together with the weight of the disconnector 54' and of the pin 63. The purpose of this arrangement is to prevent the inertia of the lower portions of the fire control member and the inertia of the disconnector from causing any undesirable movements in cases where the firearm, while being moved in one or the other direction, is suddenly stopped, which, for example, occurs when the butt of the firearm hits the ground or other firm object, so that the inertia of the concerned parts tends to continue their movement in the same direction which might result in undesired changes of the position of the fire control member.

*Functioning of the fire control mechanism of Figure 56 (Including description of modified forms of such mechanisms)*

With the fire control member in the position as illustrated in Figures 56 and 62, the firearm is in automatic setting. If, after the firing of the first round, the trigger should be held back, the sear 29' will be held forward and the lower shoulder 43' of the sear will be well within reach of the right rear end 44' (Figure 63) of the disconnector 54'. As the operating slide 92 moves forwardly to chamber the second round, it depresses toe 126' at the forward end of the disconnector lever 84', thus causing lever 84' to rotate clockwise about pin 86'. Such clockwise rotation causes the downwardly extending arm 67' at the rearward end of lever 84' to move upwardly against the force of spring 68'. As the arm 67' moves upwardly, its tang 70 positioned in slot 71' of the disconnector 54' causes the forward end of the disconnector to move upwardly about pin 63, which will cause its right rear end 44' to bear against the lower shoulder 43' of the sear, depressing the front end 42' (Figure 63) of the sear and thus releasing the hammer 26' (Figure 56) from abutting engagement with the front end of the sear.

In order to change the setting from full-automatic to semi-automatic, the finger piece 62 of fire control member 61' has to be moved farther forward to the position SA which will cause the next valley in the corrugation 48 of the flat spring to engage the pin 50, so that the disconnector 54' will be positioned forwardly of its previous position and out of reach of the shoulder 43' of sear 29'.

When the finger piece 62 of control lever 61 is pushed still farther forward to the position S, the firearm is in safety position. When the firearm is on safety, the conical end 169 of the pin 63 is below the solid portion 166' (Figures 62 and 63) of the forward end of the trigger, thus blocking the forward end of the trigger and preventing the whole trigger from moving into the squeezed position.

In order that the recoil of the firearm or other jarring action will not be capable of causing a change in the selected position of fire control member 61', positive locking means are provided for member 61' as will now be described. If the fire control member is set on "automatic fire" and the trigger is squeezed, then the forward end of the trigger will be consequently lowered and will, with the vertically arranged rib 170 (Figures 60, 62 and 63), block the conical end 169 of the pin 63, thus preventing the control member from undesired movement to the position SA (semi-automatic) during the firing. In the case of semi-automatic setting the selector-safety member is secured in substantially the same way, the only difference being that the conical end 169 of the pin 63 is located on the other or forward side 167 (Figure 63) of the rib 170.

A second firing and fire control mechanism illustrated in Figure 64 differs somewhat in structure from the one shown in Figures 56 and 62, but its function is based on the same principle. Figure 65 illustrates a portion of Figure 64 in top view and the parts which are modified as designated by the suffix s. In the position as illustrated in both figures, the fire control member 61' is in automatic setting. When the forward end 165s of the trigger 46s is lowered, the tang 229 on the forward end of the trigger will block the projecting end 169s of the pin 63s, preventing the fire control lever from moving forward. It will be noted that the end 169s of the pin 63s is not conical, as distinguished from pin 63 in Figure 63. If the fire control lever is moved to the next position S, the end 169s of the pin will be under the bottom 166s of the tang 229, blocking the trigger from movement into squeezed position and thus functioning as a safety. If the member is moved to the third position SA, the firearm will be in semi-automatic setting. Upon squeezing of trigger 46s while control member 61' is in position SA, the member will be locked against rearward movement by engagement between pin-projection 169s and the forward side of tang 229.

The control member setting in Figure 64 can be changed from any position to automatic in one straight pull, the same as in the arrangement in Figure 56. Advantages of modification of Figure 64 consist in the fact that the setting from safe to automatic can be changed in a shorter pull than the previous one, and further, it is also easier to manufacture. However, in the modification of Figure 64, the safe setting is in the middle which may not be as desirable as having the safe setting on the extreme end of the movement of the fire control lever, as it is in Figure 56.

Figure 77 is a perspective view of a disconnector 54t similar to one shown in Figures 56 and 58. The disconnector 54t is of slightly modified design to make it suitable for production by stamping from sheet metal. With the exception of the suffix t, the reference numbers in Figure 77 are identical with those in Figure 56, and the disconnector of Figure 77 may be substituted for the disconnector of Figure 56.

A third firing and fire control arrangement for the firearm of Figure 56 is illustrated in Figures 82–85 and functions on a principle which in some instances is identical with the one disclosed in Figures 56 and 62. The main difference is in the fire control member 61u which is specifically designed for the purpose of making it easier to manufacture. The disconnector 54t is identical with the one illustrated in Figure 77 and can be replaced by the disconnector of Figure 56. The hammer 26u is similar to hammer 26 in Figure 1 and can also be used in Figure 56 if the pin 60u is also used. Further, the firing and fire control arrangement of Figures 82–85 is interchangeable as a complete unit with the firing and fire control arrangement of Figure 56 without requiring any modificaitons in the trigger housing 6', and with the exception of the fire control member 61u and of the locking spring 272 all other parts in Figures 82–85 function in basically the same way as corresponding parts of Figure 56.

The fire control member 61u consists of a rigid band which is bent into a form resembling the letter U (Figure 84) and is pivoted on the hammer pin 60 carried in the sidewalls of the trigger housing 6'. Farther downward, the fire control lever carries a pin 63u on which the disconnector 54t is pivoted. The purpose of the bends 268 (Figure 84) is to reduce friction between adjacent parts. In a depression 52 (Figure 66) formed in the bottom of the trigger housing, a plate 217 (Figures 82, 83, 84) is fixed by means of the original pins 50 and 64 shown also in Figure 56. The fire control member or lever 61u in Figures 82 and 84 includes a freely accessible finger piece 62u. The finger piece 62u extends upwardly through a transverse slot 223 (Figure 85) in the bottom of member 61u, then forwardly (Figure 82), then upwardly, and finally rearwardly where its end 272 is coiled around pin 60u. As shown in Figure 82 the profile shape of finger piece 62u resembles the outline of a dipper so that its upper portion will not interfere with movement of the bottom of hammer 26u. The finger piece 62u passes through a slot 270 in the plate 217 and is biased by coils 272 (Figure 84) into engagement with the right side of slot 270 which has the notches 218, 219 and 220 as shown in Figure 83. As shown in Figure 82, the finger piece is in the full-automatic setting where it is held in notch 218. In order to change the setting from the full-automatic to the semi-automatic, the finger piece 62u has to be turned aside (by the forefinger) in direction indicated by the arrow 273 (Figure 84) and pushed forwardly toward the position SA (Figure 82) using the left border 274 of the opening 270 as a guide. As the position SA is reached, the movement of the finger piece will be interrupted by the notch 221, which is exactly opposite the locking notch 219. The finger piece may then be released and it will automatically swing over into notch 219 where it will be locked in the semi-automatic position.

If the finger piece 62u is in the position S, the fire control mechanism is on safe, with the upper left shoulder 275 of disconnector 54t (Figures 82 and 84) blocking downward movement of the forward end 166u of the trigger, in the same manner as described for Figure 56, with the only difference being that in the firearm of Figure 56 the forward end 166' of the trigger is blocked by the pin 63.

In view of the very efficient locking action caused by engagement of finger piece 62u in the locking notches, the fire control member of Figures 82, 83 and 84 need not be counter-balanced, as distinguished from the fire control member of Figure 56. For the same reason, the forward end 166u (Figure 82) of the trigger need not be provided with rib 170 (Figure 63).

In order to prevent the hammer 26u and the hammer pin 60u from any movement sideways, portions 376 of said pin are enlarged to block such movement, similarly as in the firearm of Figure 1.

The hammer pins 60' and 60u (Figures 56 and 82) are carried in the side walls of the trigger housing 6' in slots 222 (Figure 66) instead of the usual holes, so that as previously described for Figure 1, the hammer pins can be removed from trigger housing with all parts attached to it. Thus all of the parts supported by the pins 60' and 60u can be easily disassembled and assembled in the open instead of in the cramped space in the trigger housing. This feature is especially useful in the case of the fire control mechanism of Figures 82 and 84 where it would be very difficult to keep all the parts properly aligned inside the trigger housing while inserting the hammer pin from the outside, chiefly because of the tension of the spring coils 272.

Since in the firearm of Figure 56 the fire control member 61' (Figure 60) prevents the hammer from moving sideways, a conventional hammer pin 60' may be used therein.

Automatic ejection of empty magazine and interruption of automatic firing upon chambering of the last round in the firearm of Figure 56

As the bolt 57 (Figures 15 and 56) moves forward to chamber the last round, the follower 193 (Figure 33) is pushed, in the manner explained in connection with the firearm of Figure 1, through the opening 197 in the front of the magazine (Figures 33, 35, 54) against the face of the slanted bridge 93' (Figures 56, 70, 71 and 72) of the magazine catch 102', rotating the catch forwardly into release position.

At the same time that the magazine catch is rotated forwardly, the disconnector lever guide 208' (Figures 67, 70 and 71) presses against one side of the curved portion 180' (Figures 67, 70 and 75) of the disconnector lever 84', unseating said lever from the left notch 360 (Figure 61) and pushing it into the right notch 361, thus causing the forward end of the disconnector lever with the toe 126' to move to one side (as indicated by the arrow 205' in Figures 67 and 70) out of reach of the camming surface 90 (Figure 56) on the operating slide. This action results in the interruption of automatic firing because the disconnector lever 84' will not be rotated by operating slide 92' to cause the automatic firing as previously explained. While the disconnector lever is being transferred from the notch 360 into the notch 361, its center section as well as its rearward end will rise somewhat which might rotate the disconnector far enough to trip the sear. In order to prevent this, adequate clearance is provided between the rearward end 44' of the disconnector and the shoulder 43' of the sear to allow for said transfer of the disconnector lever without tripping the sear.

In order to prevent the toe 126' (Figure 56), as well as the whole disconnector lever, from wobbling from side to side, the rear end of the disconnector lever is provided with the vertical arm 67' (Figures 56, 60, 62, 75 and 76) of which portions 66 and 70 are bent to one side touching the auxiliary wall 59 in the trigger housing (Figures 56 and 67) which together with the right side wall 88' of trigger housing 6' (Figure 67) secures the spur 67' and consequently also the whole disconnector lever in the vertical position. Accordingly, as the disconnector lever guide 208' pushes the disconnector lever 84' aside, the disconnector lever is rotated about the axis A—A (Figures 56 and 62); the hole 85' in the lever which receives pin 86 being enlarged to accommodate the movement about axis A—A. The auxiliary wall 59 serves also as forward stop for the hammer 26'.

Increase in trigger tension upon ejection of empty magazine 106' in Figure 56

If the ejection of the empty magazine 106' is not blocked from the outside, spring 68' lowers the disconnector lever 84', thus forcing pin 86' and ejector 79' downwardly. During the initial movement of lever 84', its entire length will tend to move downwardly, but toward the end of the downward movement, toe 126' will be stopped by the surface 364 of shoulder 366' (Figures 67 and 68). Then as lever 84' continues downwardly under the force of spring 68', the rearward end of the lever will move with increased speed to rotate the disconnector 54' clockwise in Figure 56, causing the left rear end 53' (Figures 56, 58, 62 and 63) of the disconnector to bear against the reinforced portion 45' of the forward end of the trigger, which being felt by the finger serves as a warning that the empty magazine has been ejected and only one more round remains in the chamber. This increase in trigger tension occurs when the firearm is set for full-automatic as well as semi-automatic action, similarly as in the firearm of Figure 1.

Automatic release of spare magazine 148' as magazine 106' is ejected in Figure 56

The automatic release of spare magazine 148' occurs in the same manner previously described for the firearm of Figure 1. Thus, as the magazine ejector 79' ejects the empty magazine 106', the spare magazine release 116' at the forward end of ejector 79' raises upward, thus releasing the projection 132' on the right side of the magazine 148' in the manner described in connection with Figure 6.

Firing of last round without insertion of new magazine in Figure 56

In the modified firearm of Figure 56, as in the firearm of Figure 1, the last round may be fired even though a new magazine is not inserted in the magazine opening. In this respect, the modification of Figure 56 functions in the same manner previously described in connection with the firearm of Figure 1; that is, the last round may be fired simply by squeezing trigger 46' against the added force of spring 68'.

Interruption of automatic firing and increase of trigger tension as affected by failure of magazine ejection in Figure 56

In all cases where the ejection of the empty magazine is blocked from the outside, the chambering of the last round will still interrupt the full-automatic firing by rotating the magazine catch 102' into release position as previously explained, similarly as in the firearm of Figure 1. After the disconnector lever guide 208' (Figures 67, 70 and 71) passes forward, pushing aside the forward end of the disconnector lever 84', the disconnector lever, being driven by the force of the spring 68' (Figures 56 and 80), starts to rotate about the pivot 86' and as its forward end moves upward, the step 107' which is provided on the disconnector lever blocks the disconnector lever guide at its top 290' (Figures 70, 71), thus holding the magazine catch 102' open even if the tang 72 of the follower should slip out of slot 56 in bolt 57 as the rear portion of the bolt is cammed upwardly during locking action of the bolt. The reason for making certain that the catch 102' is held open is to eliminate the need for opening it manually after the magazine 106' is freed from the obstruction which was preventing its ejection.

At the same time that the forward end 126' of the disconnector lever 84' moves upward, the rearward end moves downward, causing the disconnector 54' to rotate clockwise in Figure 56 so that its left rear end 53' (Figures 56, 58, 62 and 63) engages the reinforced portion 45' on the forward end 165' of the trigger if the fire control member 61' is set for either semi- or full-automatic action. Thus, the normal trigger tension is increased by the force of spring 68'.

Further, if the ejection of the empty magazine is prevented and the last round is fired while the empty magazine is still in the weapon, the follower 193 which at the time has been held upward by spring 184 may fail to follow the rearward movement of the bolt quickly enough, and as the bolt moves to the rear, it will pass completely behind the follower, releasing tang 72 from the slot 56. Being thus released, the follower is free to move upwardly into the path of the bolt where it will be later during the forward movement caught by the face 73 of said bolt and with considerable force thrust against the face of the bridge 93' (Figures 56, 70, 71 and 72) of the magazine catch. In order to protect follower 193 against damage, the follower is provided near its rear end with an abutment stop 191 (Figures 32, 33, 34 and 61) which after the loading of the last round engages a cornice 190 (Figures 32 and 61) formed in the retaining lips of the magazine, thus preventing the follower from moving farther upward.

However, since the cornice 190 prevents the follower with the tang 72 from following the upward movement of the bolt during locking of the bolt, the tang 72 may slip off the solid portion 39 of the bolt, which may have the result that the magazine spring 184 would return the follower into the magazine. This, of course, would free the magazine catch 102' so that it would rotate backward, and lock the empty magazine inside the magazine opening before it could be ejected. One solution of this problem, in which the disconnector lever 84' holds the magazine catch open by means of the step 107' (Figure 56) has been disclosed in the preceding text of this description.

Another way of preventing the tang 72 from being disconnected from the bolt, is to arrange the bolt in a slanted position, with its rear end lowered, thus compensating for the upward movement during the locking, so that after the bolt is locked, its bottom 291 (Fig. 15) will be in a horizontal position. The fact that the locking lug 16 on the rear end of the bolt is much farther to the rear than the edge of the solid portion 39 of the bolt results in the upward locking movement of portion 39 being relatively small compared to that of lug 16 and thus helps also to decrease the possibility of disengaging the solid portion 39 from the tang 72.

It will be further noted that if a turning bolt is used as for example in the U.S. M1 and M2 carbines, then neither the step 107 (Figure 56) or the disconnector lever nor any other safeguards are needed, since the turning bolt does not make any movements which could cause the tang 72 to become disconnected from the bolt during the locking action. The adaptability of a turning bolt to the present invention will be further described hereinafter.

It also will be noted that in the firearm of Figure 1 the possibility that the tang 72 might disconnect itself from the bolt creates no such problems since there the catch is kept in release position by the locking action of the bow spring 118.

*Insertion of spare magazine 148' into the magazine opening into the magazine opening in Figure 56 (including description of modified magazine catch)*

After the ejection of the empty magazine 106' which proceeds in the same way as in the firearm of Figure 1, the spare magazine may be transferred into the magazine opening as will now be described. Magazine 148' is grasped with the hand on the rough portion 156 and pushed with a straight rearward motion toward the magazine catch 102' (following the straight portion of dashed line 157 in Figure 56). After the magazine with its projections 132' enters the channel 210' (Figure 71) in the magazine catch 102' and is stopped by the edges 94 of the ribs 96' (Figure 56) which stand out from the inside surfaces of the walls of the magazine opening, the magazine will be so situated that its projections 132' will be positioned in the location indicated at 95' in Figure 56. It will be seen that the ribs 96' on walls 88' and the surfaces 97' on catch 102' form abutment crotches on each side of the firearms, which crotches serve as pivot points for the spare magazine. The magazine may then be rotated about such pivot points into the vertical position, following the curved portion of dotted line 157. After the edged portions 104' of the magazine pass through between the elastic portions 105' of the magazine catch, the elastic portions return to their former gauge (see Figures 56, 59, 70 and 71), thus blocking the edged portions 104' of the magazine and securing the magazine to its new position.

It will be noted that while the magazine is rotated into its vertical position, its upper rear edge 288' (Figure 81), instead of following the path indicated by arrow R, is guided by the wall 77 of which the uppermost portion is arranged vertically to improve the hold of the magazine 106' inside the magazine opening, similarly as shown in Figure 14.

The magazine can also be inserted into the magazine opening from the bottom of the firearm similarly as in the U.S. M1 and M2 carbines. If inserted from the bottom, the magazine will be guided at its projections 79a by the rib 83 and at its projections 95' (Figure 56) by the edges 98 of the ribs 96' and by the edges 101 of the magazine catch. As the magazine moves farther upward, the projections 95' cause the magazine catch to rotate clockwise around the pivots 124' and against the force of the magazine catch spring 118' (Figures 1 and 80). After the projections 95' pass above the tops of edges 101 (Figure 56) of the magazine catch, the magazine catch spring 118' rotates the magazine catch back to locking position, locking the magazine inside the magazine opening by means of its catch surfaces 97'.

In order to allow for the insertion of a magazine from the bottom of the firearm without causing the disconnector lever guide 208' (Figure 67) to change the position of the disconnector lever 84', the camming surface 180' on the disconnector lever is placed at adequate distance forwardly of the disconnector lever guide 208'. Thus, when the magazine catch 102' is rotated slightly forward by the insertion of a magazine directly into the magazine opening, the guide 208' will not move forward far enough to engage camming surface 180' on lever 84'.

Figure 74 illustrates a modified magazine catch 102v. A portion of the left side of the magazine catch 102v is bent inwardly to form a tang 300 projecting into the path of the projection 132v provided on the left side of the magazine. It will be understood that left and right are defined by looking from the rear of the rifle and that Figure 74 shows the inner surface of the left side of magazine catch 102v. The magazine which is used in connection with the modified magazine catch of Figure 74 differs from the magazine of Figure 78 in having the left projection 132v placed farther to the rear and (preferably, but not absolutely necessarily) slightly higher than the right projection 132 of the magazine of Figure 78. It will be understood that for the sake of clarity the magazine has been omitted from Figure 74. The projection 132 on the right side of the magazine (not shown in Figure 74) is in the same place as in Figure 78, and the right side of magazine catch 102v is exactly the same as the right side of the magazine catch 102' shown in Figure 72.

The advantage of the modification shown in Figure 74 consists in the fact that in case the magazine catch should (because of sand, frozen lubricants or other reasons) fail to rotate backward after the ejection of the empty magazine, the spare magazine, while being pushed from the spare magazine holder toward the magazine opening, will bear with the projection 132v (Figure 74) against the tang 300, thus forcing the magazine catch to rotate counterclockwise. The projections 132 (on the right side) and 132v (on the left side) of the magazine are so arranged that the magazine catch reaches its rearwardmost or closed position at the time when the projection 132 is stopped by the edge 94 of the rib 96' (Figure 56). Then, while the magazine is being rotated into the vertical position about the projection 95' (Figure 56) of which the pivot point is in Figure 74 indicated by the numeral 301, the projection 132v (Figure 74) will pass from its solid line position in front of the tang 300 downwardly and rearwardly into the dotted line position beneath said tang. It will be seen that the dotted line position of projection 132v places it in proper locking engagement with the catch surface 97v. It will be noted that the position of the rib Y1 (Figure 78) can be changed to accommodate the changed position of the projection 132v (Figure 74) and thus maintain the desirable magazine holding arrangement disclosed in Figure 78.

*Resumption of automatic firing upon insertion of new magazine into magazine opening in Figure 56*

Reviewing first the magazine ejecting action, it will be recalled that spring 68' moves the disconnector lever 84' downward. As this is in progress, the disconnector lever engages the camming surface 362 (Figures 67 and 68) of the laterally projecting portion 366' (see also Figure 66) of the right side wall of the magazine opening and is cammed to the left, which transfers the disconnector lever from alignment with the right notch 361 into alignment with the left notch 360 (Figure 61). This action transfers the toe 126' back into vertical alignment with the cam 90 of the operating slide which at that time is in its forward position. The downward movement of the disconnector lever is stopped by the horizontal surface 364 (Figure 68).

If a new magazine is inserted into the magazine opening, it will force the ejector 79' upwardly. The upwardly moving magazine ejector will now carry the disconnector lever 84' in the left notch 360 (Figure 61) raising said lever against the force of the spring 68' until the toe 126' engages the under surface of cam 90, so that during the final inserting movement of the magazine the upward movement of the pivot pin 86' causes the rear portion 67' of the lever 84' to move upwardly. As previously explained, upward movement of rear portion 67' of the disconnector lever causes the disconnector 54' to rotate counter-clockwise which, in case the trigger is held squeezed, trips the sear 29' thus disconnecting it from holding engagement with hammer 26' and automatically resuming the full-automatic firing.

The functions of the firearm of Figure 56 which were described in the preceding paragraph differ from corresponding functions of the firearm of Figure 1 mainly in the use of camming surface 362 (Figure 68) to align the toe 126' vertically with the cam 90 of the operating slide before a new magazine is inserted into the magazine opening. In the firearm of Figure 1, such alignment is effected by the disconnector lever guide 208 during the rearward movement of the magazine catch 102 upon transferring a spare magazine from the spare magazine holder into the magazine opening. The reasons for providing a different arrangement for effecting said alignment of the toe 126' with the cam 90 in the firearm of Figure 56 will now be described. In the firearm of Figure 56, after the ejection of the empty magazine and consequently also after the downward movement of the disconnector lever 84' has progressed far enough to lower the step 107' (Figures 56 and 76) out of holding engagement with the magazine catch 102', the magazine catch being driven by the force of the magazine catch spring 118' (Figures 56 and 80), automatically returns to locking position. However, if the ejection of the empty magazine were obstructed after the magazine catch was released but before the toe 126' of the disconnector lever progressed downwardly far enough to clear the cam 90 of the operating slide, then a catch provided with a disconnector lever guide 208, as shown in Figure 18, while rotating rearwardly to closed position, would cam the disconnector lever back to the left thus forcing the toe 126' against the side of the cam 90. This action might jam the disconnector lever 84' and prevent downward movement of the disconnector lever when the blocked magazine is later released. In order to prevent this possibility, the magazine catch 102' (Figures 70 and 71), employed in the firearm of Figure 56, is provided with a disconnector lever guide 208' which is open on the side, so that the catch can return freely into locking position without camming the disconnector lever to the left side.

Turning-type bolt

In the forms of the invention discussed previously, a tilting-type bolt has been used. However, a turning-type bolt such as used in the U.S. M1 and M2 carbines can also be adapted for use in the present invention. Figure 87 illustrates the forward portion of such a bolt 57y as viewed from the bottom and showing the locking lug 232 and the operating lug 233. The bolt 57y is shown in unlocked position in Figure 88 and in locked position in Figure 89. Because of the turning movement of bolt 57y during locking, portions of the slot 56y have been made wider than in the tilting bolt 57 of Figure 16 in order to accommodate the magazine tang 72 during locking. In addition, the solid portion 39y at the end of slot 56y is recessed so that during chambering of a round said solid portion will not reach down far enough to engage the round which succeeds the round being chambered.

Figure 86 shows a top plan view of a slightly modified magazine 106y for use with the turning bolt 57y. In order to prevent the rear portions of the retaining lips 324 of the magazine 106y from being caught by the face of the bolt 57y, the clearance between said portions is enlarged in the rear at 325.

In order to facilitate an understanding of the invention, reference has been made to the embodiments thereof shown in the accompanying drawings and detailed descriptive language has been employed. It will, nevertheless, be understood that no limitation of the invention is thereby intended and that various changes are contemplated as would ordinarily occur to one skilled in the art to which the invention relates.

Having thus described the invention, what is claimed as new and desired to be secured by Letters Patent is:

1. In a magazine-fed firearm having a reciprocating bolt, a magazine opening in said firearm, a magazine receivable in said opening, a magazine catch for securing said magazine in said opening, said magazine catch being movable into a release position permitting ejecton of said magazine, and mechanism for operating said catch into release position upon movement of said bolt in chambering the last round, said catch operating mechanism comprising a follower movable upwardly in said magazine and forwardly adjacent the top of said magazine, an abutment on said follower engageable by said bolt as said bolt moves forwardly to chamber the last round and an abutment on said magazine catch engageable by said follower upon forward movement of said follower to move said catch to said release position, whereby as said bolt moves forwardly to chamber the last round the bolt drives said follower forward and said follower moves said catch into release position.

2. A magazine-fed firearm as claimed in claim 1 comprising in addition means for holding said magazine catch in release position, whereby if ejection of a magazine from said opening does not progress properly said magazine catch will be held open.

3. A firearm as claimed in claim 2 in which a magazine ejector is movably mounted in said firearm, and said means for holding said magazine catch in release position comprises a member movable with said magazine ejector, whereby when said ejector completes its ejecting movement said movable member is positioned to free said magazine catch for movement into said closed position.

4. A firearm as claimed in claim 2 in which said means for holding said magazine catch in release position comprises a spring, said catch being pivotally mounted for movement between its closed position and its release position, a connection between said spring and said catch, and a connection between said spring and said firearm, the line formed by said connections passing on one side of said pivotal mounting when the catch is closed and on the other side when the catch is open, whereby the spring serves to bias the catch both in the release position and in the closed position.

5. In a magazine-fed firearm having a reciprocating bolt, a magazine opening in said firearm, a magazine receivable in said opening, a magazine catch for securing said magazine in said opening, said magazine catch being movable into a release position permitting ejection of said magazine, and mechanism for ejecting said magazine from said opening upon movement of said bolt in chambering the last round, said magazine ejecting mechanism comprising a follower movable upwardly in said magazine and forwardly across the top of said magazine, an abutment on said follower engageable by said bolt as said bolt moves forwardly to chamber the last round, an abutment on said magazine catch engageable by said follower upon forward movement of said follower to move said catch to said release position, a magazine ejector in engagement with said magazine, and a magazine ejector spring forcing said ejector against said magazine in a direction which tends to force said magazine out of said magazine opening.

6. A magazine-fed firearm having a reciprocating operating slide, a magazine opening in said firearm, a magazine receivable in said opening, a magazine catch for securing said magazine in said opening, said magazine catch being movable into a release position permitting ejection of said magazine, and mechanism for actuating said catch into said release position as said operating slide moves forwardly in chambering the last round, said catch actuating mechanism comprising an abutment member movable into engagement with said catch when said last round is removed from said magazine, said catch being movable into said release position upon actuation by said abutment member, and means reciprocating with said operating slide for moving said abutment member into releasing engagement with said magazine catch upon forward movement of said operaitng slide in chambering the last round.

7. In a magazine-fed firearm having a barrel, walls on opposite sides of said firearm forming a spare magazine holder, grooves formed on the inner surfaces of said walls, said grooves being generally parallel to the axis of said barrel, a magazine received in said spare magazine holder, said magazine having two projections on each of two opposite sides thereof, said projections on each side of said magazine being substantially spaced from each other longitudinally along said magazine so that there are two pairs of projections spaced diagonally on opposite sides of said magazine, said projections being narrower than said grooves and received within said grooves, said grooves and said projections being so positioned that when said magazine is inserted in said holder one pair of said diagonally positioned projections engages the lower edges of said grooves and the other pair of said diagonally positioned projections engages the upper edges of said grooves, whereby said magazine is rigidly secured in said spare magazine holder.

8. A magazine-fed firearm as claimed in claim 7 in which a portion of the upper edge of one said groove on one of said walls is inclined downwardly from the inner surface of said wall, and a portion of the lower edge of one said groove on said one wall is inclined upwardly from the inner surface of said wall, said magazine being so positioned in said spare magazine holder that said projections on one side of said magazine engage said inclined groove edges on said one wall whereby said magazine is cammed toward the other of said walls.

9. A magazine-fed firearm as claimed in claim 7 in which a portion of one edge of one of said grooves is formed by a spare magazine release.

10. A magazine-fed firearm as claimed in claim 9 comprising a spare magazine catch spaced from said spare magazine release, said spare magazine release and said spare magazine catch having mutually facing latch surface.

11. In a magazine-fed firearm having a barrel, walls on opposite sides of said firearm forming a magazine opening and a spare magazine holder positioned forwardly of said magazine opening, the inner surfaces of said walls of said spare magazine holder having grooves therein extending generally parallel to the axis of said barrel, said walls and said grooves forming a passageway between said spare magazine holder and said magazine opening, a magazine having two spaced projections on each of two sides thereof, said magazine being receivable in said spare magazine holder with said projections positioned in said grooves, said projections on each side of the spare magazine being spaced lengthwise of the firearm when the magazine is received in the spare magazine holder, abutment means positioned inwardly of said walls adjacent the forward end of said magazine opening and forming an abutment crotch on each side of said magazine opening, said abutment crotch on each side of said magazine opening being substantially in line with the groove on the same side of the firearm and opening toward the front of the firearm, the two rearwardly positioned magazine projections being receivable in said crotch when said magazine is moved rearwardly from said spare magazine holder to said magazine opening, the lower wall of each of said grooves having an opening therein intermediate the length of said groove, the distance between said openings and said crotches being substantially equal to the distance between the projections on each side of said magazine whereby when said rearward projections are received in said crotches said forward projections are positioned at said openings so that said magazine may be rotated downwardly and rearwardly into final position in said magazine opening.

12. A magazine-fed firearm as claimed in claim 11 in which said magazine comprises a third projection on each of its said sides, wall portions positioned rearwardly of said magazine opening and forming an empty magazine retainer, grooves on the inner surfaces of said retainer wall portions adapted to receive said third magazine projections, the groove in each of said retainer walls comprising a generally vertical portion and a portion opening rearwardly from the bottom of said generally vertical portion, and a portion opening forwardly from a position above the bottom of said generally vertical portion, the distance between said forwardly opening portion and said abutment crotch being substantially equal to the distance between said third projections and said forward projections on said magazine whereby as said magazine is moved rearwardly and rotated into said magazine opening, said rearward magazine projections are received in said crotches and said third projections pass through said forwardly opening groove portions and into said generally vertical groove portions of said magazine retainer.

13. A magazine-fed firearm as claimed in claim 11 in which a magazine catch is provided for said magazine opening and forms a portion of said abtument crotch, said magazine catch comprising two side walls spaced laterally of said firearm and forming a portion of said passage from the spare magazine holder to the magazine opening, said catch being movable between locking and release positions, a catch-closing abutment extending inwardly from one of the side walls of said catch, and one of said projections on said magazine being engageable with said catch closing abtument when said magazine is moved rearwardly from said spare magazine holder into said magazine opening.

14. A magazine-fed firearm as claimed in claim 11 in which resiliently biased means are provided for preventing reverse rotation of said magazine from said magazine opening back into said spare magazine holder.

15. A magazine-fed firearm as claimed in claim 11 in which a spare magazine release forms an obstruction in said passageway between said spare magazine holder and said magazine opening, said spare magazine release being movable to a release position in which it does not obstruct said passageway.

16. A magazine-fed firearm as claimed in claim 15 in which a magazine ejector is provided for said magazine opening and said spare magazine release is connected to said magazine ejector whereby upon ejecting movement of said magazine ejector said spare magazine release is moved to said release position.

17. In a magazine-fed firearm having a barrel, walls on opposite sides of said firearm forming a magazine opening and a spare magazine holder positioned forwardly of said magazine opening, the inner surfaces of said walls of said spare magazine holder having grooves therein extending generally parallel to the axis of said barrel, said walls and said grooves forming a passageway between said spare magazine holder and said magazine opening, the lower wall of each of said grooves having an opening therein intermediate the length of the groove, abtument means positioned inwardly of said walls adjacent the forward end of said magazine opening and forming an abutment crotch on each side of the firearm, said abutment crotch on each side of the firearm being substantially in line with the groove on the same side of the firearm, and said abutment crotches being open toward the front of the firearm.

18. A magazine-fed firearm as claimed in claim 17 in which a magazine catch is provided for said magazine opening and said crotch-forming abutment means are formed partially by said magazine catch and partially by stationary abutment means, and said magazine catch being movable away from said stationary abutment means whereby a magazine can be inserted directly into said magazine opening as well as from said spare magazine holder.

19. A magazine-fed firearm as claimed in claim 17 in which a magazine catch is provided for said magazine opening and a magazine ejector is movable downwardly in said magazine opening, said crotch-forming abutment means being formed partially by said magazine catch and partially by said magazine ejector.

20. A magazine catch for a magazine-fed firearm, said catch having spaced side walls connected by a bridge adjacent the tops of said walls, said walls each having a slot extending across the inner surface thereof, the rearward edge of each of said side walls having a rearwardly extending lip positioned below the rear ends of said slots, the upper edges of said lips forming catch surfaces, portions of the rearward edges of said side walls being resiliently biased inwardly, said inwardly biased portions being positioned below said rearwardly extending lips, the rearward edges of said inwardly biased wall portions forming additional catch surfaces, and means on said magazine catch for pivotally mounting said catch in a firearm.

21. A magazine-fed firearm comprising wall portions on opposite sides thereof forming a magazine opening, wall portions positioned forwardly of said magazine opening and forming a spare magazine holder, and wall portions positioned rearwardly of said magazine opening and forming an empty magazine retainer.

22. A magazine-fed firearm comprising wall portions rigidly positioned on opposite sides thereof forming a magazine opening, and wall portions rigidly positioned on opposite sides of said firearm adjacent said magazine opening and forming an empty magazine retainer, the walls of said magazine opening being connected with the walls of said magazine retainer and together forming a passage through which a magazine can pass from the magazine opening into the empty magazine retainer, said empty magazine retainer having means for holding a magazine ejected from said magazine opening.

23. In a magazine-fed firearm having a barrel, walls on opposite sides of said firearm forming a magazine opening and an empty magazine retainer, each of said walls of said retainer having a groove on the inner side thereof adapted to receive a projection on a magazine, each of said grooves being generally perpendicular to the axis of said barrel and slanting slightly forward at the lower end, and rails projecting rearwardly from the lower portions of said grooves slightly above the bottoms of the grooves, whereby when a magazine is ejected from said magazine opening, projections on the magazine will be guided downwardly by said grooves and be caught on said rails.

References Cited in the file of this patent

UNITED STATES PATENTS

| Number | Name | Date |
|---|---|---|
| 1,147,906 | Swebilius and Hanitz | July 27, 1915 |
| 1,229,721 | Cooke | June 12, 1917 |
| 1,405,685 | Hammond | Feb. 7, 1922 |
| 1,709,399 | Herlach et al. | Apr. 16, 1929 |
| 1,784,355 | Herlach et al. | Dec. 9, 1930 |
| 1,996,124 | Rowley | Apr. 2, 1935 |
| 2,130,383 | End | Sept. 20, 1938 |
| 2,305,033 | Roemer | Dec. 15, 1942 |
| 2,321,045 | Roemer | June 8, 1943 |
| 2,325,484 | De Kiraly et al. | July 27, 1943 |
| 2,363,772 | Browning | Nov. 28, 1944 |
| 2,380,326 | Norman | July 10, 1945 |
| 2,471,779 | Roermer | May 31, 1949 |
| 2,479,419 | Serried | Aug. 16, 1949 |
| 2,622,359 | Belleri | Dec. 23, 1952 |
| 2,642,688 | Johnson, Jr. | June 23, 1953 |
| 2,654,175 | Hansen | Oct. 6, 1953 |
| 2,655,754 | Brush | Oct. 20, 1953 |
| 2,710,476 | Garand | June 14, 1955 |
| 2,715,789 | Garand | Aug. 23, 1955 |
| 2,750,700 | Harvey | June 19, 1956 |